US012656713B2

(12) United States Patent

Ohnishi et al.

(10) Patent No.: US 12,656,713 B2

(45) Date of Patent: Jun. 16, 2026

(54) IMAGE FORMING APPARATUS

(71) Applicant: CANON KABUSHIKI KAISHA, Tokyo (JP)

(72) Inventors: Takahiro Ohnishi, Chiba (JP); Asuna Fukamachi, Chiba (JP); Shigeru Tanaka, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/988,745

(22) Filed: Dec. 19, 2024

(65) Prior Publication Data

US 2025/0244700 A1 Jul. 31, 2025

(30) Foreign Application Priority Data

Jan. 25, 2024 (JP) ................................ 2024-009351

(51) Int. Cl.

*G03G 15/20* (2006.01)

*G03G 21/20* (2006.01)

(52) U.S. Cl.

CPC ....... *G03G 15/205* (2013.01); *G03G 15/2053* (2013.01); *G03G 15/2064* (2013.01); *G03G 21/206* (2013.01)

(58) Field of Classification Search

USPC ........................................................ 399/33

See application file for complete search history.

(56) References Cited

U.S. PATENT DOCUMENTS

| | | | | |
|---|---|---|---|---|
| 2010/0158546 A1* | 6/2010 | No | .................... | G03G 15/2064 399/16 |
| 2023/0229102 A1 | 7/2023 | Yamaguchi | | |

FOREIGN PATENT DOCUMENTS

| | | |
|---|---|---|
| EP | 2562605 A2 | 2/2013 |
| JP | 2019-053198 | 4/2019 |
| JP | 6988297 B2 | 1/2022 |

OTHER PUBLICATIONS

Extended European Search Report dated Jun. 11, 2025 in counterpart European Patent Appln. No. 24220455.0.

* cited by examiner

*Primary Examiner* — Quana Grainger

(74) *Attorney, Agent, or Firm* — Venable LLP

(57) ABSTRACT

An image forming apparatus includes an executing portion for operating in a borderless image forming mode in which a toner image is formed in an edge portion of a recording material and for operating in a normal image forming mode in which the toner image is not formed in the edge portion, an image forming portion, a fixing device, a heating portion, a nip forming portion, and a temperature detecting portion, and a controller. In the case of the borderless image forming mode, the controller controls the heating portion so that a temperature thereof becomes a first control temperature in a first period in which the recording material passes through the fixing nip. In the case of the normal image forming mode, the controller controls the heating portion so that the temperature thereof becomes a second control temperature higher than the first control temperature in the first period.

18 Claims, 11 Drawing Sheets

IMAGE FORMING APPARATUS

FIELD OF THE INVENTION AND RELATED ART

The present invention relates to an image forming apparatus such as a copying machine, a printer, a facsimile machine, a multi-function machine having a plurality of functions of these machines, and the like.

As the image forming apparatus, in addition to an image forming apparatus operable in an image forming mode in which a margin is provided in an edge portion of a recording material and in which image formation is carried out, an image forming apparatus operable in a borderless image forming mode in which the image formation is carried out to the edge portion of the recording material has been known.

In an operation in the borderless image forming mode, an image is formed in a size larger than the recording material and then is transferred onto the recording material, and therefore, toner is liable to be deposited on an edge of the recording material. The toner deposited on the edge of the recording material is not readily fixed on the recording material and is easily peeled off when a user touches the toner, so that the toner is deposited on a portion other than the recording material, and thus contamination occurs inside the image forming apparatus. For this reason, in Japanese Laid-Open Patent Application No. 2019-53198, a technique such that a cleaning means for cleaning the toner deposited on the edge of the recording material is provided and then a side surface of the recording material is cleaned after a fixing step has been proposed.

SUMMARY OF THE INVENTION

According to an aspect of the present invention, there is provided an image forming apparatus capable of executing an operation in a borderless image forming mode in which a toner image is formed in an edge portion of a recording material of a predetermined size and an operation in an image forming mode in which the toner image is not formed in the edge portion of the recording material of the predetermined size, the image forming apparatus comprising: an image forming portion configured to form the toner image on the recording material; a fixing device including a fixing member, a heating portion for heating the fixing member, a nip-forming portion for forming a fixing nip in which the recording material is nipped and conveyed between itself and the fixing member and for fixing the toner image on the recording material when the recording material on which the toner image is carried passes through the fixing nip, and a temperature detecting portion for detecting a temperature of the fixing member or the heating portion; and a controller configured to control the heating portion on the basis of a detection result of the temperature detecting portion, wherein in a case where the operation in the image forming mode is executed for the recording material of the predetermined size, the controller controls the heating portion so that the temperature becomes a first control temperature in a first period which is a period in which the recording material passes through the fixing nip, and wherein in a case where the operation in the borderless image forming mode is executed for the recording material of the predetermined size, the controller controls the heating portion so that the temperature becomes a second control temperature higher than the first control temperature in the first period.

According to another aspect of the prevent invention, there is provided an image forming apparatus comprising: an executing portion configured to operate in a borderless image forming mode in which a toner image is formed in an edge portion of a recording material of a predetermined size and to operate in an image forming mode in which the toner image is not formed in the edge portion of the recording material of the predetermined size; an image forming portion configured to form the toner image on the recording material; a fixing device including a fixing member, a heating portion for heating the fixing member, a nip-forming portion for forming a fixing nip in which the recording material is nipped and conveyed between itself and the fixing member and for fixing the toner image on the recording material when the recording material on which the toner image is carried passes through the fixing nip, and a temperature detecting portion for detecting a temperature of the fixing member or the heating portion; and a controller configured to control the heating portion on the basis of a detection result of the temperature detecting portion, wherein in a case where the operation in the image forming mode is executed for a predetermined recording material, the controller controls the heating portion so that the temperature becomes a first control temperature in a second period from passing of an upstream end, with respect to a conveying direction, of a first recording material through the fixing nip until a downstream end, with respect to the conveying direction, of a second recording material subsequent to the first recording material reaches the fixing nip, and wherein in a case where the operation in the borderless image forming mode in which an image is formed in the edge portion of the predetermined recording material with respect to the conveying direction is executed, the controller controls the heating portion so that the temperature becomes a second control temperature higher than the first control temperature in the second period.

Further features of the present invention will become apparent from the following description of exemplary embodiments with reference to the attached drawings.

Figure 3:
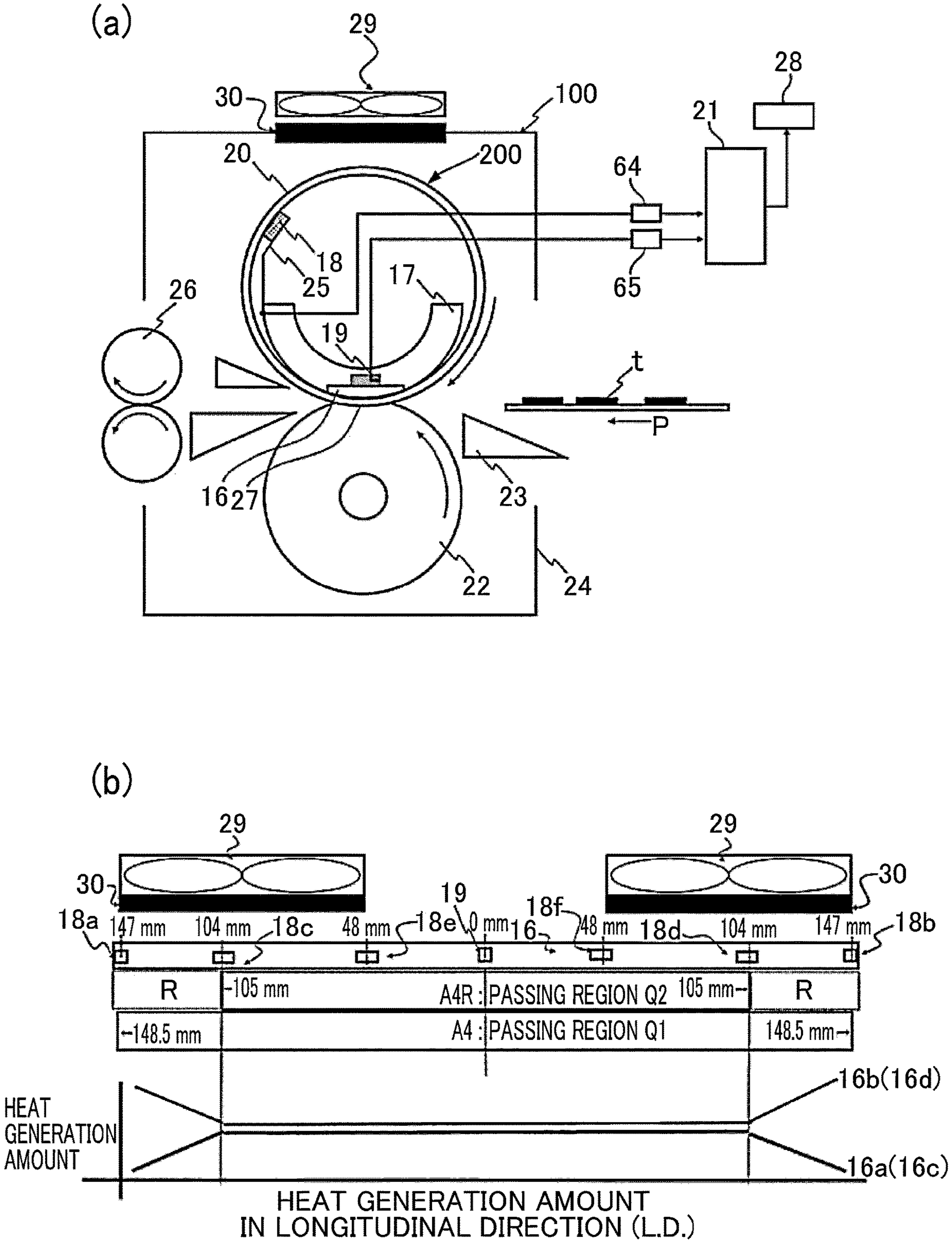

Part (a) of FIG. 3 is a schematic sectional view of a fixing device in the first embodiment, and part (b) of FIG. 3 is a schematic view showing an arrangement of thermistors with respect to a longitudinal direction and a heat generation amount of a fixing heater with respect to the longitudinal direction in the fixing device in the first embodiment.

Figure 4:
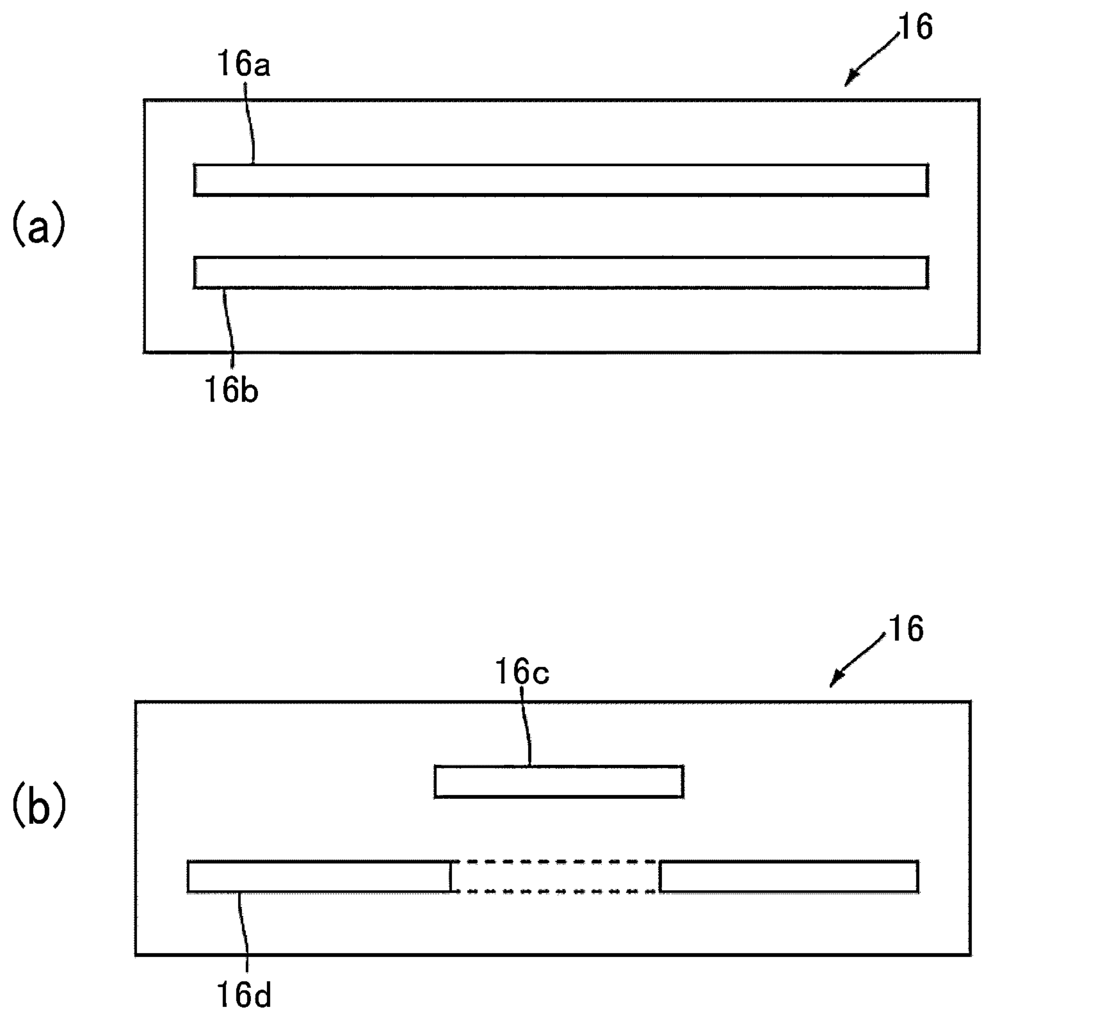

Parts (a) and (b) of FIG. 4 are schematic views showing a first example and a second example, respectively, of the fixing heater in the first embodiment.

Figure 5:
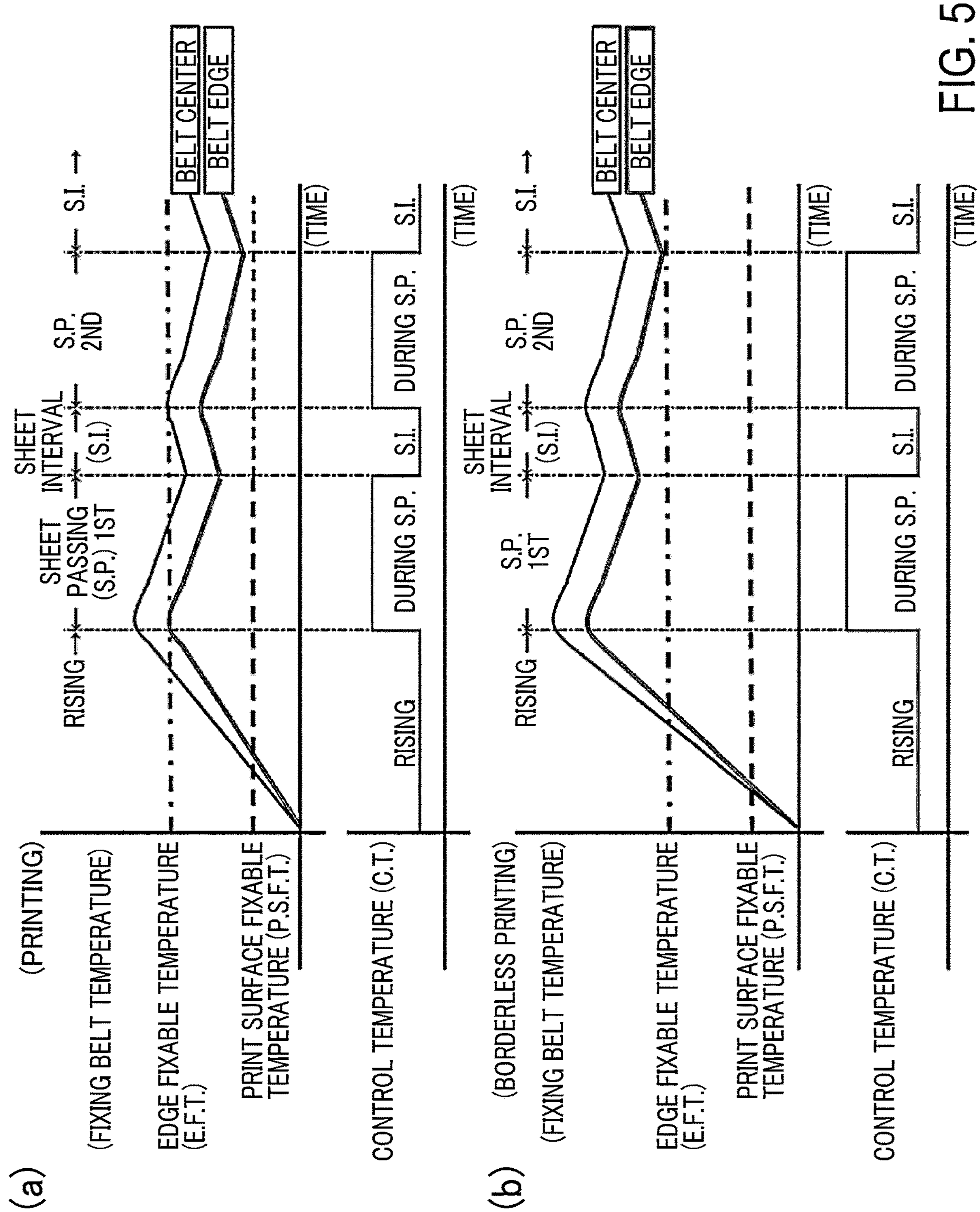

Parts (a) and (b) of FIG. 5 are graphs showing control temperatures and temperature progressions in operations in an image forming mode and a borderless image forming mode, respectively, in the first embodiment.

Figure 6:
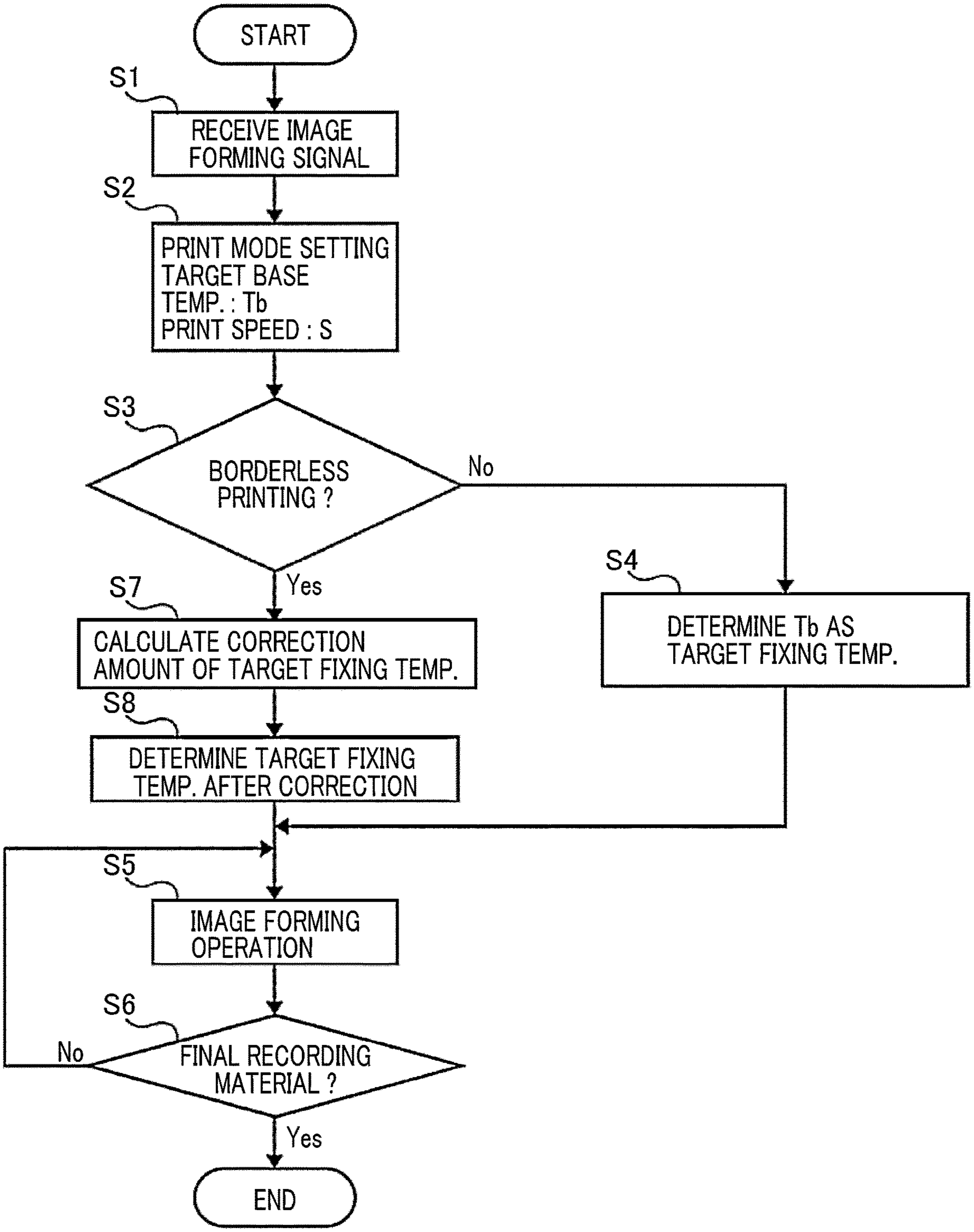

FIG. 6 is a flowchart of an image forming operation in the first embodiment.

Figure 7:
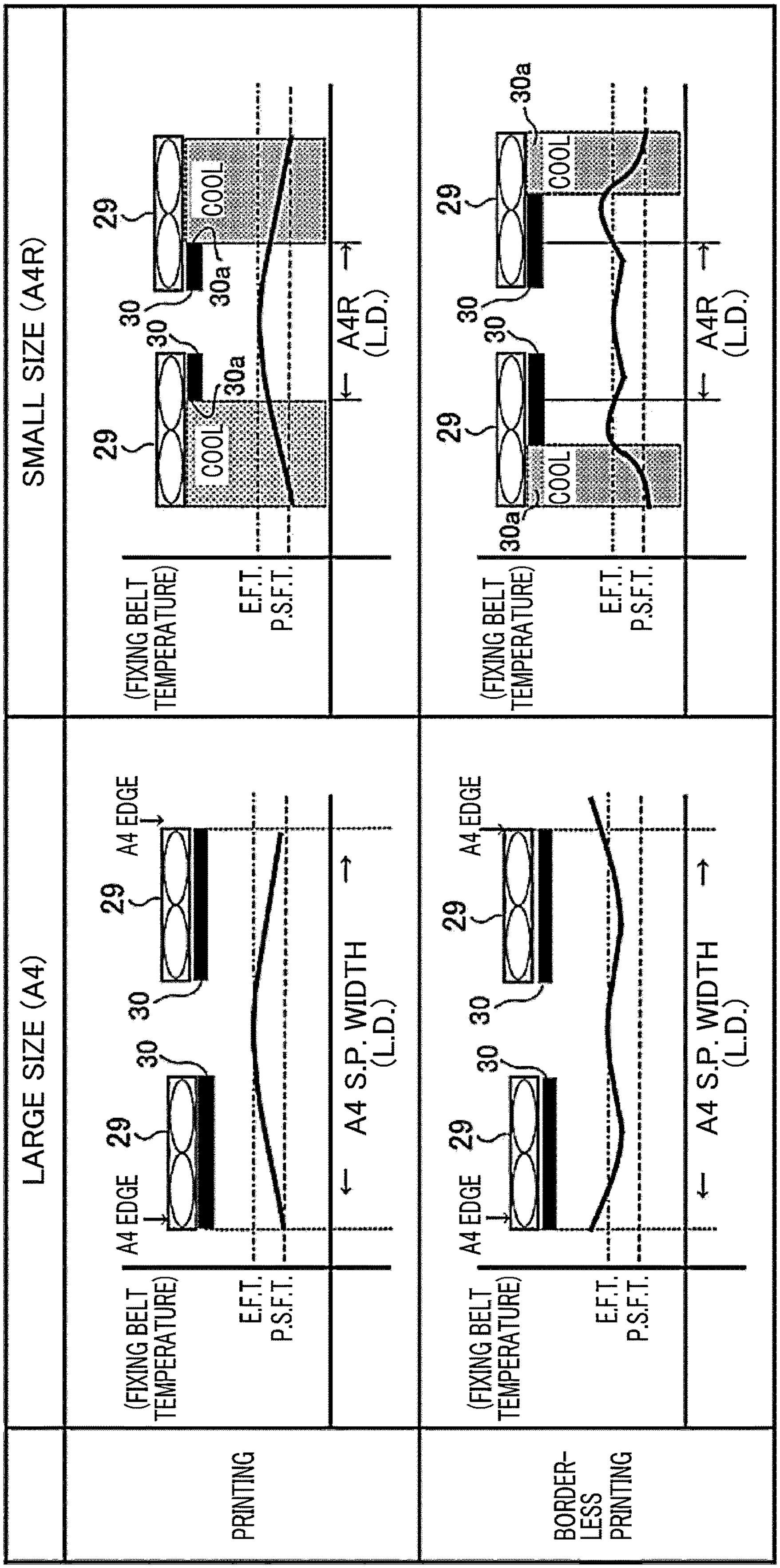

FIG. 7 is a schematic view showing temperature distributions with respect to the longitudinal direction in the image forming mode and the borderless image forming mode in a second embodiment.

Figure 8:
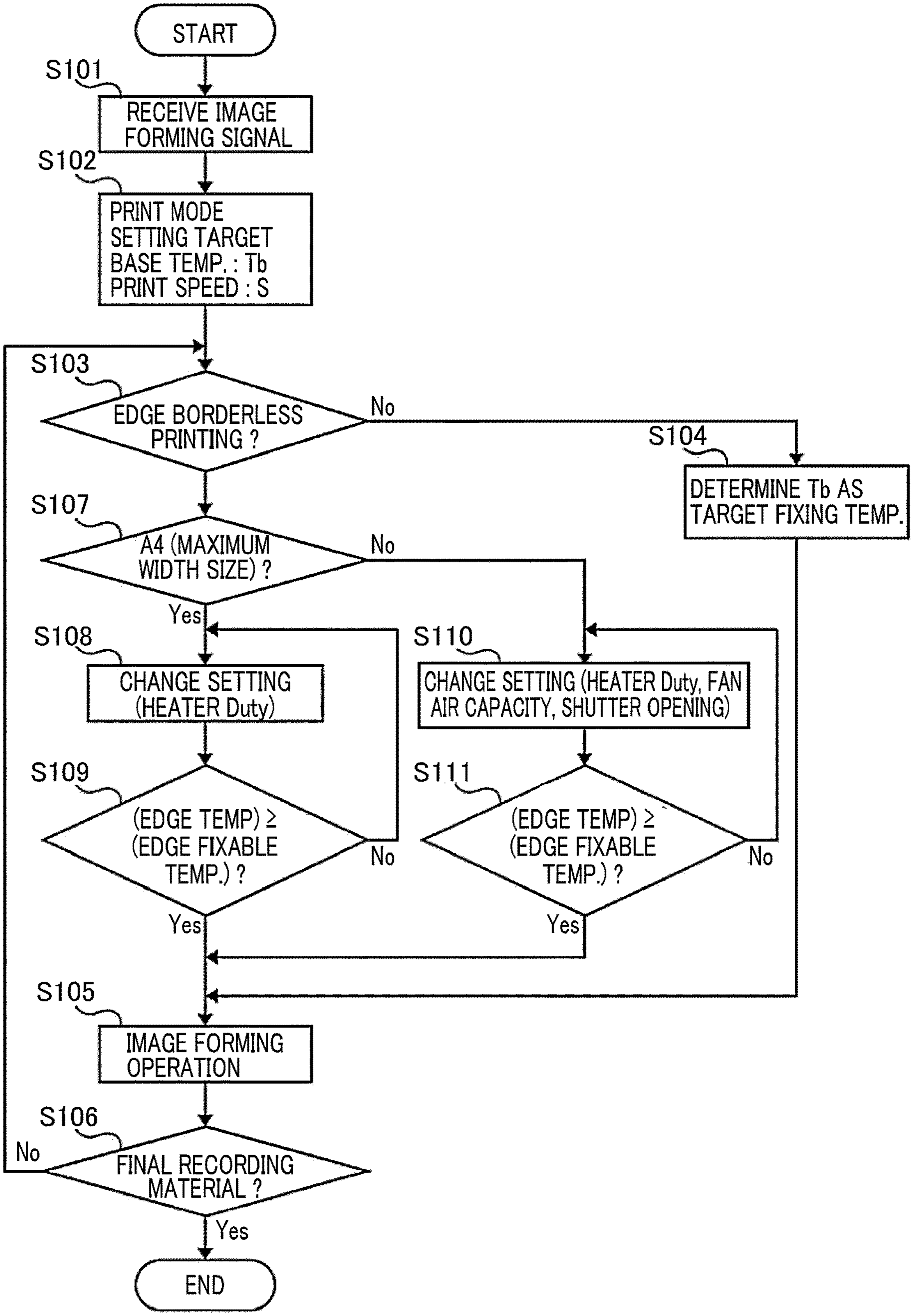

FIG. 8 is a flowchart of an image forming operation in the second embodiment.

Figure 9:
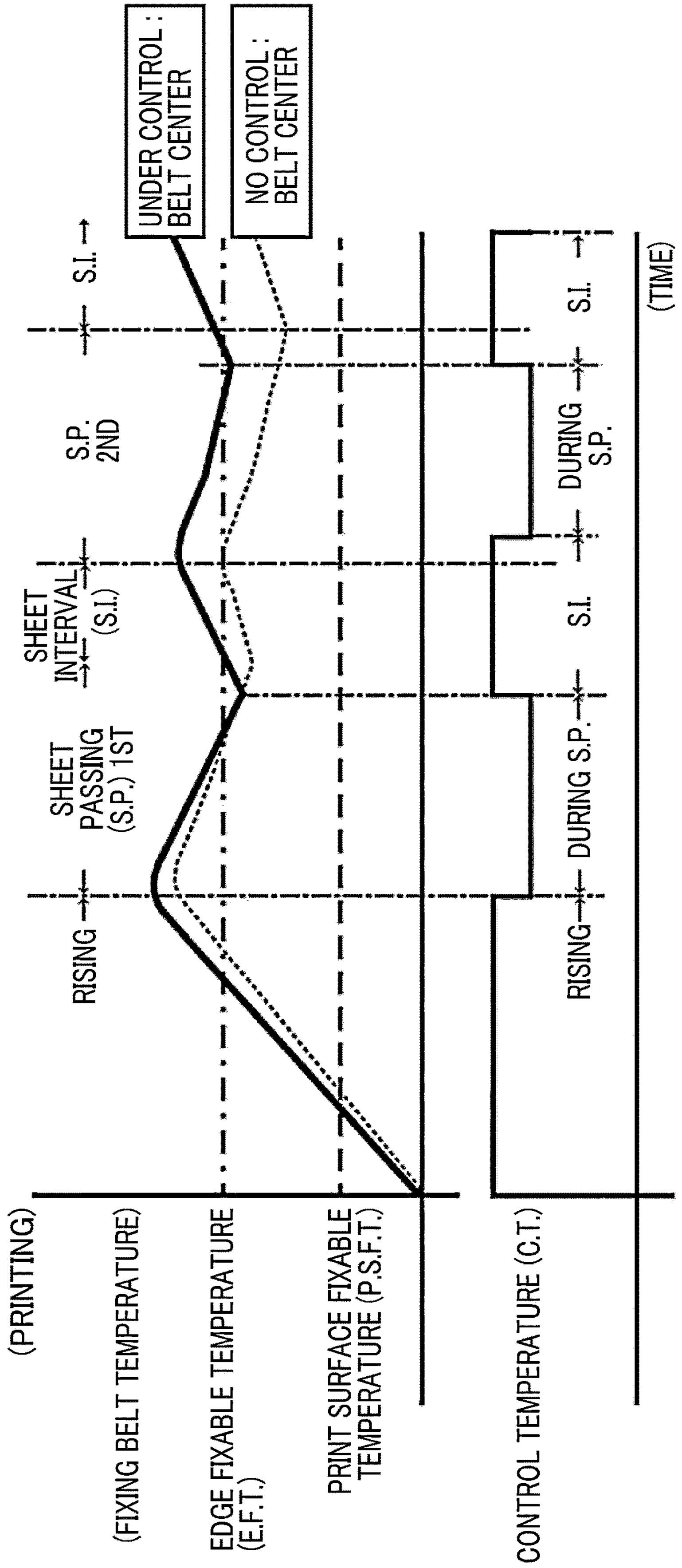

FIG. 9 is a graph showing a control temperature and a temperature progression of a fixing belt in a borderless image forming mode in a third embodiment.

Figure 10:
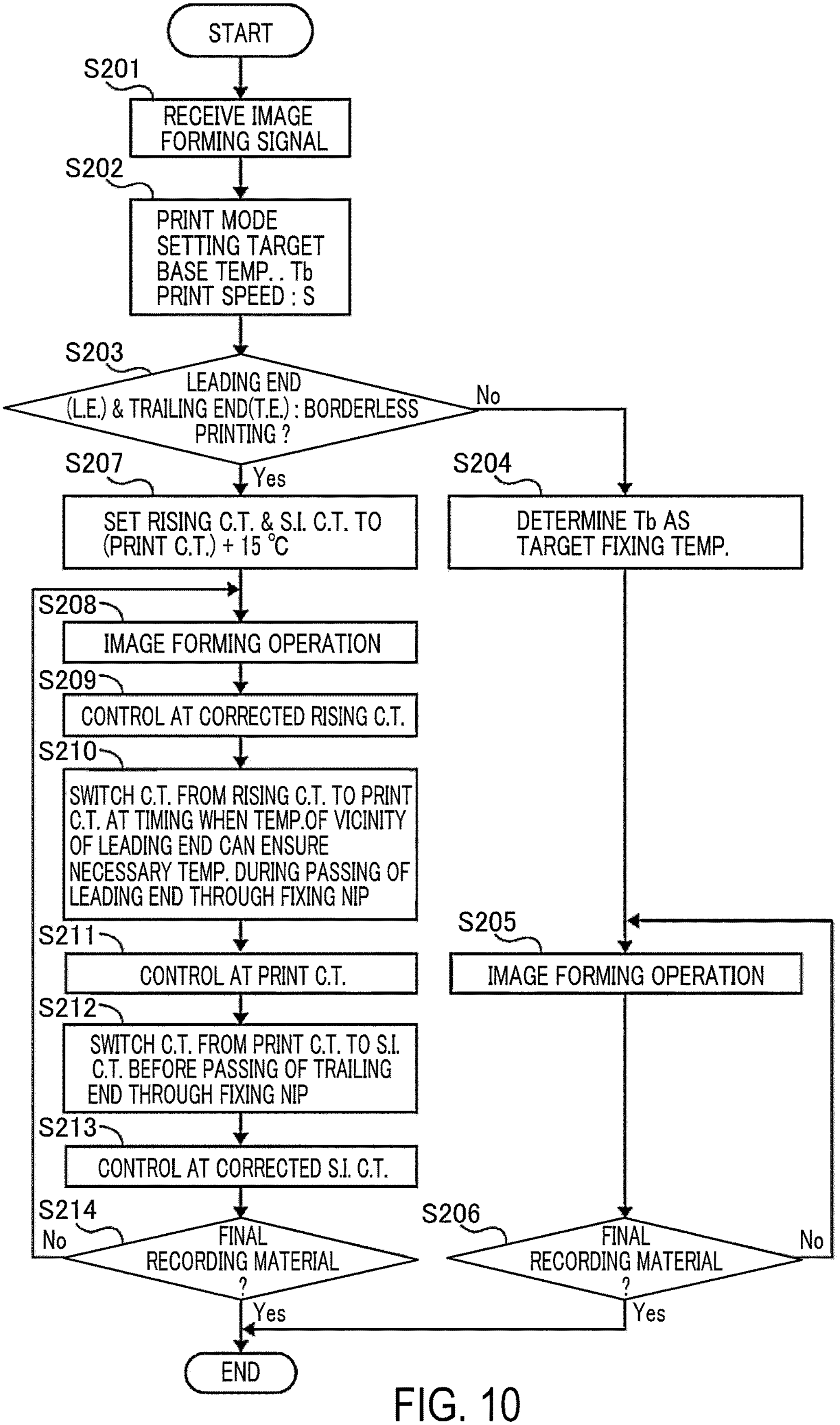

FIG. 10 is a flowchart of an image forming operation in the third embodiment.

Figure 11:
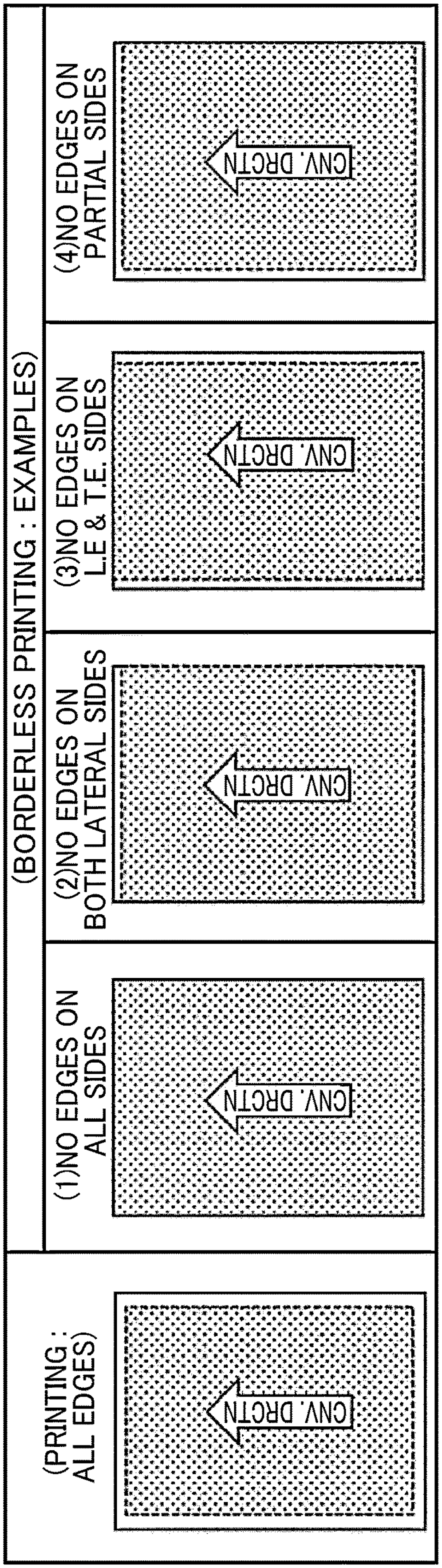

FIG. 11 is a schematic view showing images in the image forming mode and the borderless image forming mode.

DESCRIPTION OF THE EMBODIMENTS

First Embodiment

A first embodiment will be described using FIGS. 1 to 6 and 11. First, a general structure of an image forming apparatus according to this embodiment will be described using FIG. 1.

[Image Forming Apparatus]

An image forming apparatus 1 is a full-color printer of an electrophotographic type including four image forming portions Py, Pm, Pc, and Pk provided correspondingly to four colors of yellow, magenta, cyan, and black, respectively. In this embodiment, a tandem type in which the image forming portions Py, Pm, Pc, and Pk are disposed along a rotational direction of an intermediary transfer belt 105 described later is employed. The image forming apparatus 1 forms a toner image (image) on a recording material depending on an image signal from an unshown image reading portion (original image reading device) or a host device such as a personal computer communicatably connected to the image forming apparatus 1. As the recording material, it is possible to cite a sheet, a plastic film, a cloth, and the like.

Each of the image forming portions Py, Pm, Pc, and Pk includes a photosensitive drum 101 of an image bearing member, a charging roller 102 as a charging device, a developing device 104, a primary transfer roller 111 as a primary transfer device, a drum cleaner 107 as a cleaning device, and the like. The photosensitive drum 101 is rotationally driven in a counter clockwise direction indicated by an arrow in FIG. 1 at a predetermined process speed (peripheral speed). The photosensitive drum 101 is electrically charged to a predetermined polarity by the charging roller 102 during a rotation process thereof.

The charged surface of the photosensitive drum 101 is exposed to laser light 103, outputted from an exposure device 110, on the basis of inputted image information. The exposure device 110 subjects the surface of the photosensitive drum 101 to scanning exposure to light by outputting the laser light 103 modulated (ON/OFF) correspondingly to a time-series electric digital pixel signal of the image information from an image signal generation device such as an unshown image reading portion or the like. By this scanning exposure to light, on the surface of the photosensitive drum 101, an electrostatic latent image corresponding to the image information are formed. Incidentally, the laser light 103 outputted from the exposure device 110 is deflected to an exposure position of the photosensitive drum 101 by a mirror 109.

The developing device 104 develops the electrostatic latent image, formed on the photosensitive drum 101, in the developer. In each of the developing devices 104 of the image forming portions Py, Pm, Pc, and Pk, toner of a color corresponding to the associated one of the image forming portions is accommodated, and a toner image of the color is formed on the photosensitive drum 101 of the associated one of the image forming portions. The toner image on the photosensitive drum 101 is primary-transferred on the surface of the intermediary transfer belt 105 in a which is a contact portion between the photosensitive drum 101 and the primary transfer portion T1 intermediary transfer belt 105 as an intermediary transfer member. Specifically, the primary transfer roller 111 disposed so as to oppose the photosensitive drum 101 through the intermediary transfer belt 105 therebetween electrically discharges the photosensitive drum 101 from a back surface of the intermediary transfer belt 105, and applies a primary transfer bias, of a polarity opposite to a polarity of the toner, to the photosensitive drum 101. By this, the toner image on the photosensitive drum 101 is transferred onto a surface of the intermediary transfer belt 105. Incidentally, toner remaining on the surface of the photosensitive drum 101 after primary transfer is removed by the drum cleaner 107.

A cycle of the charging, the exposure, the development, the primary transfer, and the drum cleaning, which are described above is repeated in the respective image forming portions, so that a yellow toner image, a magenta toner image, a cyan toner image, and a black toner image are formed on the photosensitive drums 101 of the image forming portions. Then, in the respective primary transfer portions T1, the toner images of the colors are successively transferred superposedly onto the intermediary transfer belt 105, so that a full-color image is formed on the intermediary transfer belt 105.

The toner images on the intermediary transfer belt 105 are secondary-transferred collectively onto the recording material in a secondary transfer portion T2. The secondary transfer portion T2 is a contact portion between an outer secondary transfer roller **106*b* and an outer peripheral surface of the intermediary transfer belt 105, stretched by an inner secondary transfer roller 106*a*, and a secondary transfer bias is applied to the secondary transfer portion T2, so that the toner images are secondary-transferred from the intermediary transfer belt 105 onto the recording material passing through the secondary transfer portion T2. The recording material is accommodated in a cassette 113, and the recording material fed from the cassette 113 is conveyed to a registration roller pair 114 and waits at the registration roller pair 114. Thereafter, a timing is controlled so that the registration roller pair 114 aligns the recording material with the toner image on the intermediary transfer belt 105, and the registration roller pair 114 conveys the recording material to the secondary transfer portion T2. Incidentally, toner remaining on the intermediary transfer belt 105 after the secondary transfer is removed by a belt cleaner 108**.

The recording material on which the toner image is transferred in the secondary transfer portion is conveyed to a fixing device 100, and is heated and pressed in the fixing device 100, so that the toner image carried on the recording material is fixed on the recording material. The recording material passed through the fixing device 100 is discharged to an outside of the image forming apparatus 1, so that a series of image forming operations is ended. Incidentally, in the case where images are formed on both sides (surfaces) of the recording material (double-side printing), when transfer and fixing of the toner image onto a first side (front surface) of the recording material are ended, the recording material is turned upside down through a reverse conveying portion 115, and then transfer and fixing of the toner image onto a second side (back surface) of the recording material are executed, and the recording material is discharged to the outside of the image forming apparatus 1.

The image forming apparatus 1 of this embodiment is capable of carrying out (normal) printing and borderless printing as shown in FIG. 11. That is, the image forming apparatus 1 is capable of executing an operation in a borderless image forming mode (borderless printing) in which the toner image is formed in an edge portion of the recording material and an operation in a (normal) image forming mode ((normal) printing) in which the toner image is not formed in the edge portion of the recording material. During the printing, by forming the electrostatic latent image on the surface of the photosensitive drum 101 in a range narrower than the recording material, as shown in a schematic image view of the "printing" of FIG. 11, a margin of about 2 to 5 mm is provided in the edge portion (all edges) of the recording material in a final product.

On the other hand, during the borderless providing, by forming the electrostatic latent image on the surface of the photosensitive drum 101 in a range broader than the recording material, as shown in a schematic image view of the "borderless printing" of FIG. 11, no margin is provided in the edge portion of the recording material in the final product. The schematic image view of the "borderless printing" of FIG. 11 shows examples of the borderless printing, image formation is executed so as not to provide the margin in at least one of edge portions of four edges on both sides with respect to a conveying direction of the recording material and on both sides with respect to a widthwise direction crossing the conveying direction. For example, in the schematic image view of the "borderless printing" of FIG. 11, in a first image view (1) from the left(-hand) side, image formation is executed on a whole surface of the recording material in the final product, i.e., in the edge portions of all the four edges. Further, in a second image view (2) from the left side, the margin is provided in the edge portions on the both sides in the final product with respect to the recording material conveying direction, and is not provided in the edge portions on the both sides with respect to the widthwise direction. In a third image view (3) from the left side, the margin is provided in the edge portions on the both sides in the final product with respect to the widthwise direction, and is not provided in the edge portions on the both sides with respect to the recording material conveying direction. In a fourth image view (4) from the left side, the margin is provided in the edge portions on the both sides in the final product with respective to the recording material conveying direction, and is not provided in the edge portion on one side with respect to the widthwise direction. A type of the "borderless printing" is not limited to the image views of FIG. 11, but may only be required that the toner image is formed in the edge portion(s) of the recording material.

[Controller]

The image forming apparatus 1 is provided with a control circuit portion 21 represented by a CPU (Central Processing Unit) or the like, and an operating panel 112 which is an interface for communicating with a user or an external device and for accessing the image forming apparatus 1. The operating panel 112 as an operating portion is constituted by a liquid crystal touch panel, buttons, and the like, and by operating these, it becomes possible to make various settings of the image forming apparatus 1.

Figure 1:
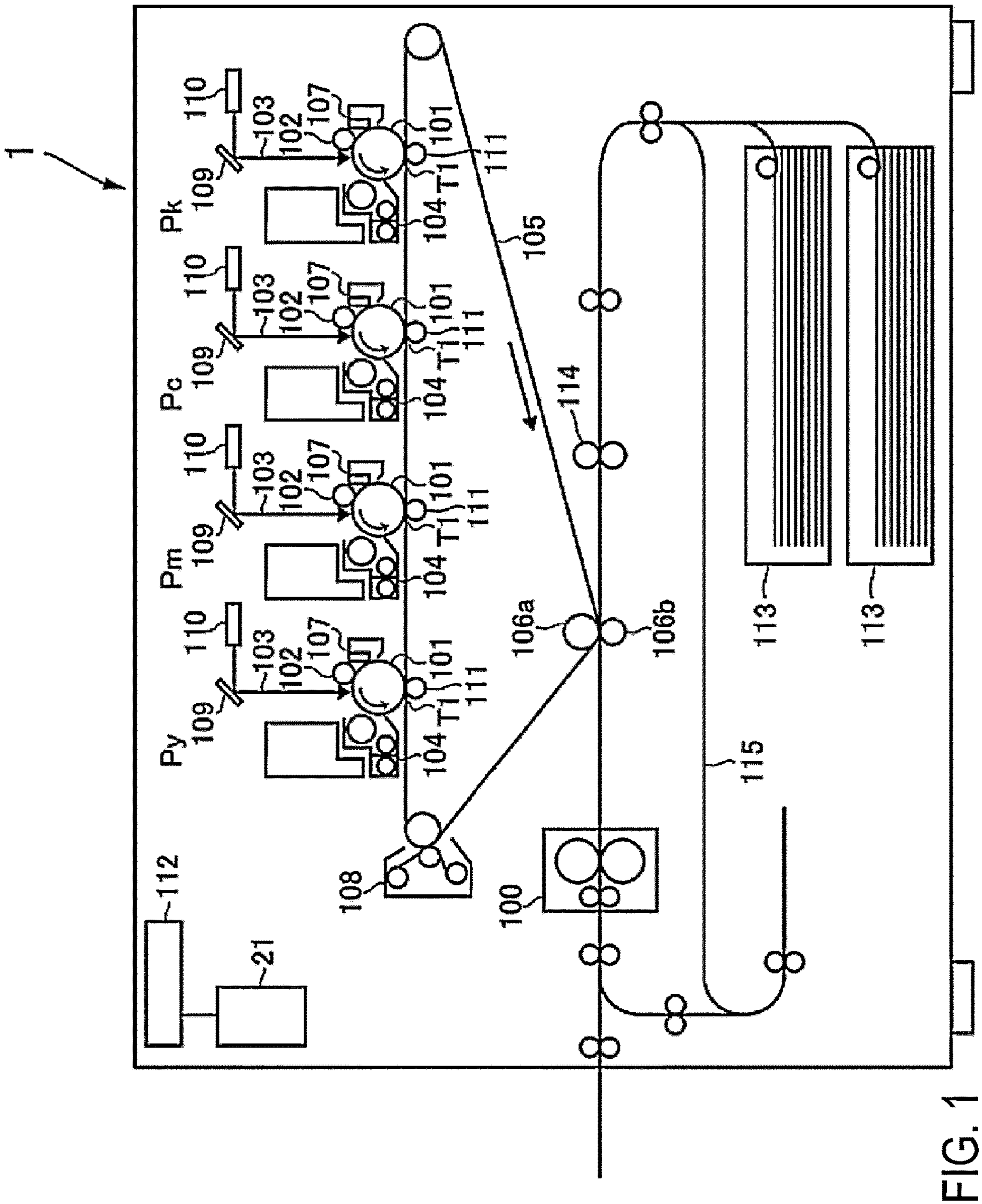
FIG. 1 is a schematic sectional view of an image forming apparatus according to a first embodiment.
Figure 2:
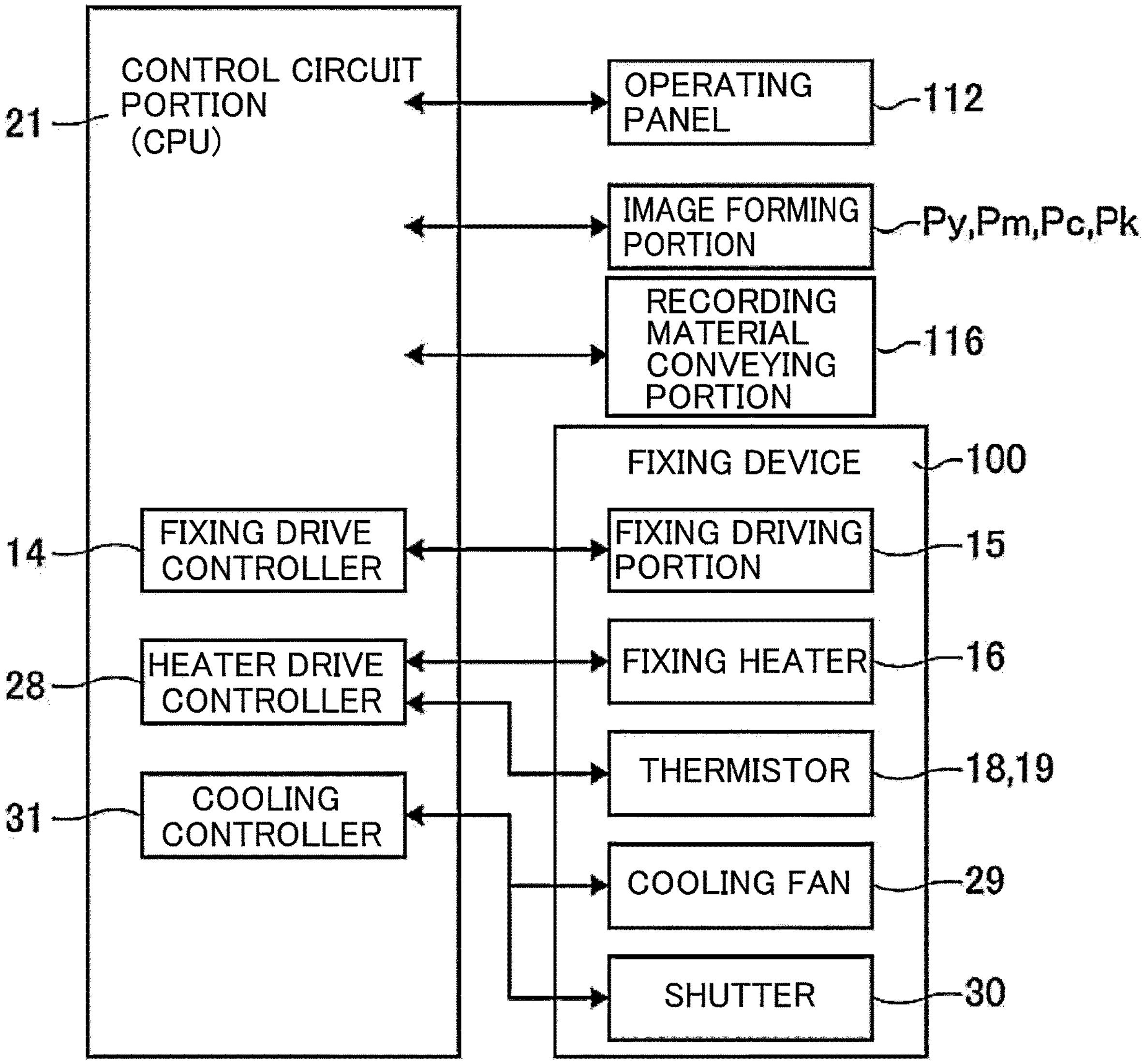
FIG. 2 is a control block diagram of the image forming apparatus according to the first embodiment.

FIG. 2 is a control block diagram of the image forming apparatus 1. The control circuit portion 21 as a controller is connected to the operating panel 112, the image forming portions Py, Pm, Pc, and Pk, a recording material conveying portion 116, and the fixing device 100, and carries out control of an operation of entirety of the image forming apparatus 1 by integrating a chain of commands between the respective devices. The recording material conveying portion 116 includes a motor for driving rollers for conveying the recording material inside the image forming apparatus 1 and a sensor for detecting the recording material.

The control circuit portion 21 includes the CPU, a ROM (Read Only Memory), a RAM (Random Access Memory). The CPU carries out control of the respective portions while reading a program stored in the ROM and corresponding to a control procedure. Further, in the RAM, working data and input data are stored, and the CPU carries out control by making reference to the data stored in the RAM, on the basis of the above-described program or the like.

Further, the control circuit portion 21 includes a fixing drive controller 14, a heater drive controller 28, a cooling controller 31. The fixing drive controller 14 controls a fixing driving portion 15. The heater drive controller 28 controls a fixing heater 16 on the basis of a detection result of thermistors 18 and 19. The cooling controller 31 controls a cooling fan 29 and a shutter 30. Constitutions of these members will be described later.

In this embodiment, from the operating panel 112 or the host device, the user is capable of selecting the borderless image forming mode and the (normal) image forming mode. Further, in the case of the borderless image forming mode, as described above with reference to FIG. 11, it also becomes possible to select whether or not the image is formed in which edge portion of the recording material. Further, when the image read by the image reading portion connected to the image forming apparatus 1 or image data sent from the host device is the image to be formed in the edge portion, the control circuit portion 21 executes the operation in the borderless image forming mode depending on the image data.

[Fixing Device]

Next, the fixing device 100 will be described using part (a) of FIG. 3 to part (b) of FIG. 4. Part (a) of FIG. 3 is a sectional structural view of the fixing device 100 along a direction perpendicular to a longitudinal direction of the fixing device 100, and part (b) of FIG. 3 is a schematic view showing an arrangement of the thermistors 18 and 19 and the cooling fan 29 with respect to the longitudinal direction of the fixing device 100 and a heat generation amount of the fixing heater 16 with respect to a longitudinal direction of the fixing heater 16. Parts (a) and (b) of FIG. 4 are schematic views showing two examples of constitutions of heat generating elements 16*a* and 16*b* and heat generating elements 16*c* and 16*d*, respectively, of the fixing heater 16.

The fixing device 100 includes a fixing belt 20, the fixing heater 16 as a heating portion, a pressing roller 22 as a nip-forming member, the thermistors 18 and 19 as a temperature detecting portion, and the like. The fixing belt 20 is a cylindrical endless belt including an elastic layer. The fixing heater 16 is supported by a heater holder 17 which has a substantial trough shape in cross section and which has a heat-resistant property, and heats the fixing belt 20. The pressing roller 22 forms a fixing nip 27, between itself and the fixing belt 20, in which the recording material is nipped and conveyed, and fixes the toner image on the recording material when the recording material on which the toner image is carried passes through the fixing nip 27.

In this embodiment, the fixing heater 16 is bonded and fixed to a lower surface of a heater holder 17 along the longitudinal direction, and is constituted so as to slidable with the fixing belt 20. Further, the fixing belt 20 is externally engaged with the heater holder 17 at a periphery of the heater holder 17. The longitudinal direction is the longitudinal direction of the fixing belt 20, and is also a direction (widthwise direction) crossing the recording material conveying direction.

With respect to the longitudinal direction, the fixing heater 16 is capable of changing a temperature of a region, in which the recording material passes through the fixing nip 27, in end portions and a central portion. Specifically, as shown in parts (a) and (b) of FIG. 4, with respect to the longitudinal direction, the fixing heater 16 includes the heat generating element 16*a* or 16*c* as a first heat generating element larger in heat generation amount of the region, in which the recording material passes through the fixing nip 27, in the central portion than in the end portions, and includes the heat generating element 16*b* or 16*d* as a second heat generating element large in heat generation amount of the region, in which the recording material passes through the fixing nip 27, in the end portions than in the central portion. In the following, heat generation of the heat generating element by energization is referred to as lighting (energization), and a ratio of energization times between the heat generating elements is referred to as a lighting ratio (energization ratio).

The heat generating elements 16*a* and 16*b* shown in part (a) of FIG. 4 are the same in length in the longitudinal direction. However, the heat generating element 16*a* is constituted so that the heat generation amount when being energized is made larger in the central portion than in the end portions. Further, the heat generating element 16*b* is constituted so that the heat generation amount when being energized is made larger in the end portions than in the central portion. The region, in which the heat generation amount is large, of the heat generating elements 16*a* and 16*b* corresponds to a length in the widthwise direction of the recording material passing through the fixing nip 27, and as described later, the lighting ratio is controlled depending on a size of the recording material.

The heat generating elements 16*c* and 16*d* shown in part (b) of FIG. 4 are different in length in the longitudinal direction. The heat generating element 16*c* is provided in the central portion with respect to the longitudinal direction, and the heat generating element 16*d* is provided in the end portions with respect to the longitudinal direction. That is, the heat generating elements 16*c* and 16*d* are different in heat generating region with respect to the longitudinal direction from each other. For this reason, in the case where the lighting ratio of the heat generating element 16*c* to the heat generating element 16*d* is large, the heat generation amount of entirety of the fixing heater 16 becomes larger in the central portion than in the end portions with respect to the longitudinal direction. On the other hand, the lighting ratio of the heat generating element 16*c* to the heat generating element 16*d* is small, the heat generation amount of entirety of the fixing heater 16 becomes larger in the end portions than in the central portion with respect to the longitudinal direction. The length and position of each of the heat generating elements 16*c* and 16*d* with respect to the longitudinal direction correspond to a length in the widthwise direction of the recording material passing through the fixing nip 27, and as described later, the lighting ratio is controlled depending on the size of the recording material. Incidentally, in the fixing heater 16, as described above, three or more heat generating elements different in heat generation amount with respect to the longitudinal direction and provided, and the lighting ratio of each of the heat generating elements may be finely controlled depending on a size, a basis weight, and a kind (for example, coated paper, plain paper, or the like) of the recording material.

A specific example of control of the lighting ratio of the heat generating element depending on the size of the recording material will be described. The lighting ratio between the heat generating element 16*a* or 16*c* and the heat generating element 16*b* or 16*d* is controlled by the control circuit portion 21 through the heater drive controller 28. Further, for example, in the case of a recording material of a maximum size, lighting is made with a lighting ratio of 50 (heat generating element 16*a* or 16*c*):50 (heat generating element 16*b* or 16*d*). Further, in the case of a recording material of a small size, control is carried out with a lighting ratio of 70 (heat generating element 16*a* or 16*c*):30 (heat generating element 16*b* or 16*d*), so that a temperature of the end portions, with respect to the longitudinal direction, through which the recording material does not pass.

The fixing belt 20 is an endless belt and has a structure such that an about 300 m-thick silicone rubber layer (elastic layer) is formed on a base material formed with an about 30 m-thick cylindrical stainless steel and the elastic layer is coated with an about 30 m-thick PFA (perfluoroalkoxy alkane) resin tube (outermost layer) as a surface layer. The pressing roller 22 has a structure such that on a surface of a core metal of Fe, an about 2.5 mm-thick silicone rubber layer and an about 50 m-thick PFA resin tube are laminated. Opposite (both) end portions of the core metal of this pressing roller 22 are rotatably held between opposite side plates of the fixing device 100.

On an upper side of the pressing roller 22, the fixing unit 200 including the fixing heater 16, the heater holder 17, and the fixing film belt is provided. This fixing unit 200 is provided in parallel to the pressing roller 22 so as to contact the pressing roller 22 on a fixing heater 16 side thereof. The heater holder 17 is formed with a liquid crystal polymer having a high heat-resistant property and has a function of holding the fixing heater 16 and guiding circulating track of the fixing belt 20. Opposite end portions of the heater holder 17 are urged in an axial direction of the pressing roller 22 with, for example, a force of 157N on one side, i.e., 314N in total by an unshown pressing mechanism. As a result, the surface of the fixing heater 16 is press-contacted against the elastic layer of the pressing roller 22 through the fixing belt 20 with a predetermined pressing force, so that the fixing nip 27 with a predetermined width necessary for fixing is formed.

The fixing heater 16 is a ceramic heater. That is, the fixing heater 16 includes heat generating resistors (heat generating element 16*a* or 16*c*, heat generating element 16*b* or 16*d*) prepared by applying electroconductive paste containing silver/palladium alloy onto a ceramic substrate of alumina or aluminum nitride in an about 10 m-thick uniform film shape by a screen printing method. Further, on the heat generating elements, a glass coat is formed in order to ensure resistance to pressure.

The thermistors 18 and 19 detect temperatures of the fixing belt 20 and the fixing heater 16. Specifically, as shown in part (a) of FIG. 3, the thermistor (also referred to as a heater back thermistor) 19 is provided on a surface (also referred to as a back surface) on a side opposite from the sliding surface of the fixing heater 16 and has a function of detecting a back surface temperature of the fixing heater 16. The thermistor (also referred to as a belt back thermistor) 18 is provided in a plurality of positions so as to elastically contact an inner peripheral surface of the fixing belt 20 and has a function of detecting an inner surface temperature of the fixing belt so at a portion above the heater holder 17 and a function of discriminating a temperature of the recording material in the edge portion.

The belt back thermistor 18 is mounted to a free end of an arm 25 formed of stainless steel fixedly supported by the heater holder 17. Further, the arm 25 is elastically swung, whereby even in a state in which motion of an inner surface of the fixing belt 20 becomes unstable, a state in which the belt back thermistor 18 stably contacts the inner surface of the fixing belt 20 is maintained is formed. The belt back thermistor 18 includes a plurality of thermistors 18*a* to 18*f* as shown in part (b) of FIG. 3. That is, the belt back thermistor is disposed in a plurality of positions, and detects the temperature of the fixing belt 20 in the positions corresponding to end portions of recording materials different in size with respect to the longitudinal direction of the fixing belt 20. Further, in part (a) of FIG. 3 are herein, either one of these thermistors 18*a* to 18*f* is also simply referred to as the thermistor 18 in some cases.

The thermistors 18*a* and 18*b* are disposed in opposite end portions, with respect to the widthwise direction, of a region in which the recording material of the maximum size passes through the fixing nip 27 (this region is also referred to as a maximum sheet passing region). The thermistors 18*c* and 18*d* are disposed in opposite end portions, with respect to the widthwise direction, of a region in which the recording material of a size smaller in length in the widthwise direction than the maximum size passes through the fixing nip 27 (this size is A4R in this embodiment). The thermistors 18*e* and 18*f* are disposed in opposite end portions, with respect to the widthwise direction, of a region in which the recording material of a further small size in length in the widthwise direction (for example, a recording material of a minimum size) passes through the fixing nip 27. Incidentally, passing of a recording material of an A4 size through the fixing nip 27 means passing of the A4-size recording material through the fixing nip 27 in a direction perpendicular to a short direction of the A4-size recording material, and passing of the recording material of the A4R size through the fixing nip 27 means passing of the A4R-size recording material through the fixing nip 27 in a direction perpendicular to a longitudinal direction of the A4R-size recording material.

The heater back thermistor 19 and the belt back thermistor 18 are connected to the control circuit portion 21 via A/D converters 64 and 65, respectively. This control circuit portion 21 samples an output from each of the thermistors at a predetermined cyclic period and has a constitution in which the thus-acquired temperature information is reflected in temperature control.

That is, the control circuit portion 21 determines contents of temperature adjustment control of the fixing heater 16 on the basis of the outputs of the belt back thermistor 18 and the heater back thermistor 19 and controls energization to the fixing heater 16 by the heater drive controller 28 which is an electric power supplying portion. In a temperature control type of the fixing device 100, a supply electric power value to the heater is determined principally so that a detection temperature value of the belt back thermistor 18 can be stably maintained to a desired temperature. As a specific method thereof, electric power is changed so that a temperature reaches a target temperature (hereinafter, also referred to as a control temperature) early and is stably maintained by being calculated from the target temperature, a detection temperature, a temperature change amount per unit time, a heater input electric power value and a PI control parameter of the belt back thermistor 18. At that time, a direct heating source is the fixing heater 16, and therefore, in order that the temperature of the fixing belt 20 is not excessively fluctuated abruptly, the detection temperature and the temperature change amount of the heater back thermistor 19 are also auxiliary subjected to PI control, so that an inner surface temperature of the fixing belt 20 is stabilized early.

When the image forming operation is started, the control circuit portion 21 drives the fixing driving portion 15 through the fixing drive controller 14, so that the pressing roller 22 is rotationally driven at a predetermined rotational speed in an arrow direction. The fixing driving portion 15 is, for example, a motor for rotationally driving the pressing roller 22. The fixing belt 20 in a press-contact relationship with the pressing roller 22 is rotated at the predetermined speed by following the pressing roller 22. At this time, the inner peripheral surface of the fixing belt 20 is in a following rotation state along the outer periphery of the heater holder 17 in an arrow direction while closely contacting the sliding surface of the fixing heater 16. On the inner peripheral surface of the fixing belt 20, heat-resistant grease is applied, so that a sliding property with the heater holder 17 and the fixing belt 20 is ensured.

When the pressing roller 22 is rotationally driven and correspondingly therewith the cylindrical fixing belt 20 is in a following rotation state, energization to the fixing heater 16 is carried out. Then, when the temperature of the fixing belt 20 becomes a desired temperature, the recording material P on which an unfixed toner image t is carried is guided and introduced into the fixing nip 27 along an entrance guide 23.

In the fixing nip 27, the recording material P closely contacts the outer peripheral surface of the fixing belt 20 on a toner image bearing surface side, so that the recording material P moves together with the fixing belt 20. In a nip-feeding process of the recording material P in the fixing nip 27, heat of the fixing belt 20 is imparted to the recording material P, so that the unfixed toner image t is melt-fixed on the recording material P. The recording material P passed through the fixing nip 27 is curvature-separated and is discharged by a fixing discharge roller pair 26.

The fixing device 100 is formed in a long shape with respect to a widthwise direction (axial direction) which is the longitudinal direction of the fixing belt 20. As shown in part (b) of FIG. 3, with respect to the longitudinal direction of the fixing belt 20 (with respect to a left-right direction of part (b) of FIG. 3), a region Q of the recording material passing the fixing nip 27 (hereinafter, this region is referred to as a fixing sheet passing region Q) changes depending on a width of the recording material. For example, in the case where the maximum size is A4, an almost all region of the fixing belt 20 with respect to the longitudinal direction becomes a fixing sheet passing region Q1, and temperatures of the recording material in the end portions are detected by the belt back thermistors 18*a* and 18*b* for detecting the temperature inside the maximum sheet passing region.

On the other hand, in the case where sheet passing of the recording material of the small size (for example, A4R) is made, the region is divided into a fixing sheet passing region Q2 through which the recording material P always passes and non-sheet passing regions R for the small size through which the small-size recording material P does not pass on both sides. Above the fixing belt 20, a pair of cooling fans 29 and the shutter 30 are provided in a position corresponding to each of the non-sheet passing region R for the small size. That is, the cooling fans 29 blow air against the fixing belt 20 in the associated end portion with respect to the longitudinal direction. Further, the shutter 30 is disposed between the cooling fans 29 and the fixing belt 20, and is capable of changing an opening width of an opening through which the air blown from the cooling fans 29 toward the fixing belt 20 is passable.

These cooling fans 29 and shutter 30 constitute a fixing cooling portion for cooling a non-sheet passing region in order to suppress temperature rise in the associated non-sheet passing region R for the small size of the fixing belt 20. Such cooling fans 29 and shutter 30 provided for the non-shutter region R for the small size perform the following cooling control operation on the basis of an operation instruction of the control circuit portion 21 through the cooling controller 31.

First, in the case where the small-size recording material narrower in width than the maximum-size recording material is used as the recording material P for use in the image formation and fixing of the image on the small-size recording material is continuously executed, the recording material P does not pass through the non-sheet passing region R as described above, and therefore, heat absorption of the non-sheet passing region R for the small size in the fixing belt 20 is eliminated, so that the temperature increases. The temperature of the fixing belt 20 in the non-sheet passing region R for the small size is detected by the associated belt back thermistor 19*a* or 19*b* for the maximum size. Further, when the detection temperature by the belt back thermistor 18*a* or 18*b* reaches the predetermined temperature, the opening width of the shutter 30 is changed to a width depending on a small-size sheet passing width (for example, a width of A4R, a width of the small-size recording material), and then a cooling operation of the cooling fans 29 are started. By this, temperature rise of the fixing belt 20 in the non-sheet passing region R for the small size is suppressed.

The belt back thermistors 18*c* and 18*d* are disposed inside (in positions of 104 mm from a center of the fixing belt 20 with respect to the longitudinal direction because the width of A4R is 210 mm) a width in the case where the recording material passing through the fixing nip 27 is the recording material of A4R. The belt back thermistors 18*e* and 18*f* are disposed inside (in positions of 48 mm from the center of the fixing belt 20 with respect to the longitudinal direction in the case where a minimum width is, for example, 100 mm) a width (sheet passable minimum width) in the case where the recording material passing through the fixing nip 27 is the minimum size recording material. Thus, by the belt back thermistors 18*c*, 18*d*, 18*e*, and 18*f* for detecting the temperature inside the sheet passing region of the recording material of a size smaller than the maximum size, the edge portion temperature of the small size recording material (in this embodiment, the recording materials of A4R and the minimum size) is detected or estimated.

A graph on a lower side of part (b) of FIG. 3 shows a heat generation characteristic of the heat generating element 16*a* (or 16*c*) and the heat generating element 16*b* (or 16*d*) with respect to the longitudinal direction. In this embodiment, the heat generating element 16*a* (or 16*c*) is larger in heat generation amount in the fixing sheet passing region Q2 than in the non-sheet passing region R, and the heat generating element 16*b* (or 16*d*) is larger in heat generation amount in the non-surface region R than in the fixing sheet passing region Q2. Further, as shown in an upper-side view of part (b) of FIG. 3, each of the pair of cooling fans 29 and the shutter 30 on each of opposite sides is disposed outside, with respect to the longitudinal direction, a position corresponding to the width of the minimum-size recording material. Further, when the recording material smaller in size than the maximum size is passed, by appropriately changing the opening width of the shutter 30, it becomes possible that the cooling fans 29 blow the air toward a region of the fixing belt 20 through which the recording material does not pass.

[Control in Operation in Borderless Image Forming Mode]

Next, control in an operation in the borderless image forming mode will be described. As described above, in the case where the borderless printing is carried out, the toner image is formed in a size larger than the size of the recording material and then is transferred onto the recording material. However, when the toner image in the size larger than the size of the recording material is transferred onto the recording material, the toner is deposited on an edge (portion) of the recording material. The toner deposited on the edge portion is not readily fixed on the recording material and is easily peeled off when the user touches the toner, so that the toner is deposited on a portion other than the recording material and thus causes contamination.

However, by verification by the inventors, as shown in a table 1 below, it was found that the toner in the edge portion can be fixed on the recording material by increasing the temperature of the fixing belt 20 in the neighborhood of the edge portion of the recording material. According to the verification, it was found that peeling-off of the toner from the edge portion can be suppressed in the case where the temperature of the fixing belt 20 in the neighborhood of the edge portion of the recording material is 200° C.

TABLE 1

| Temperature*1 (° C.) | Toner peeling*2 |
|---|---|
| 185 | YES |
| 195 | YES |
| 200 | NO |

*1"Temperature" is the belt temperature in the neighborhood of the edge portion.
*2"Toner peeling" is the toner peeling in the edge portion.

Therefore, in this embodiment, in the case where the operation in the (normal) image forming mode is executed for a predetermined recording material, the control circuit portion 21 controls the fixing heater 16 so that in a first period (during sheet passing) in which the recording material passes through the fixing nip 27, the temperature detected by the belt back thermistor 18 becomes a first control temperature (temperature control temperature). On the other hand, in the case where the operation in the borderless image forming mode is executed for the predetermined recording material, the control circuit portion 21 controls the fixing heater 16 so that the temperature detected by the belt back thermistor 18 becomes a second control temperature (temperature control temperature) higher than the first control temperature at least in either one of the first period (device the sheet passing) in which the recording material passes through the fixing nip 27 and a second period (sheet interval) from passing of an upstream end, with respect to a conveying direction thereof, of a first recording material through the fixing nip 27 until a downstream end, with respect to the conveying direction, of a second recording material subsequent to the first recording material reaches the fixing nip 27. The belt back thermistor 18 at this time is a sensor, of the above-described thermistors 18*a* and 18*f*, for detecting the belt temperature in the neighborhood of the end portion of the fixing sheet passing region Q depending on the size of the recording material passing through the fixing nip 27.

Incidentally, instead of the belt back thermistor 18, the heater back thermistor 19 may be used.

For example, the belt back thermistor 18 is omitted, and as the heater back thermistor 19, in addition to a thermistor in the central portion with respect to the longitudinal direction, thermistors are provided also in positions corresponding to the above-described thermistors 18*a* to 18*f* with respect to the longitudinal direction. By this, it is possible to carry out control similar to the control using the above-described thermistors 18*a* to 18*f*.

Part (a) of FIG. 5 shows the control temperature and a temperature progression of the fixing belt 20 during the (normal) printing, i.e., in the operation in the (normal) image forming mode. At the control temperature in the operation in the image forming mode, it is understood that the temperature (edge (portion) belt temperature) of the fixing belt 20 in the neighborhood of the edge portion of the recording material during passing of the recording material through the fixing nip 27 (during the sheet passing) is below an edge (portion) fixable temperature. For this reason, in this embodiment, as shown in part (b) of FIG. 5, the control temperature of the fixing heater 16 is controlled. Part (b) of FIG. 5 shows the control temperature and a temperature progression of the fixing belt 20 during the borderless printing, i.e., in the operation in the borderless image forming mode.

As is apparent from parts (a) and (b) of FIG. 5, during the printing, the surface temperature of the fixing belt 20 is controlled to not less than a temperature where the toner image is fixed on a printing surface (toner image-carried surface) side but during the borderless printing, the surface temperature of the fixing belt 20 is controlled to not less than the edge fixable temperature higher than the temperature where the toner image is fixed on the printing surface in order to fix the toner on the recording material in the edge portion. Here, in parts (a) and (b) of FIG. 5, the abscissa represents a time, and the ordinate represents the temperature of the fixing belt 20. Further, the "edge portion fixable temperature" is, for example, 200° C. as described with reference to the table 1, and varies depending on a size a basis weight, and a kind of the recording material. A "print surface fixable temperature" is, for example, a temperature where the toner image is fixable on the surface of the recording material in the (normal) printing, and varies depending on the size, the basis weight, and the kind. A "center belt temperature (BELT CENTER)" is a temperature of the fixing belt 20 in the central portion, and a "edge (end) belt temperature (BELT EDGE)" is a temperature of the fixing belt 20 in the neighborhood of the end portion (edge portion) of the fixing sheet passing region Q depending on the size of the recording material.

Further, "rising control temperature (RISING)" is a control temperature in a rising period from a start of heating of the fixing heater 16 (i.e., a start of energization) until a downstream end of a first recording material with respect to the conveying direction reaches the fixing nip 27. A "control temperature during sheet passing (DURING S.P.)" is a control temperature in a period (first period, during the sheet passing) in which the recording material passes through the fixing nip 27. A "sheet interval control temperature (S.I.)" is a control temperature in a period (second period, sheet interval) from passing of an upstream end of the first recording material with respect to the conveying direction until a downstream end, with respect to the central portion, of a second recording material subsequent to the first recording material reaches the fixing nip 27. In this embodiment, in the case of the operation in either of the (normal) image forming mode and the borderless image forming mode, the rising control temperature and the sheet interval control temperature are made lower than the control temperature during the sheet passing.

In this embodiment, in the case where the operation in the borderless image forming mode is executed, the control circuit portion 21 controls the fixing heater 16 at the second control temperature in the first period (during the sheet passing). That is, as regards the rising temperature control and the sheet interval temperature control, the control temperature is the same between the operation in the image forming mode and the operation in the borderless image forming mode, and as regards the temperature control during the sheet passing, the control temperature in the operation in the borderless image forming mode is made higher than in the operation in the image forming mode. Incidentally, also as regards the rising temperature control and the sheet interval temperature control, the control temperature in the operation in the borderless image forming mode may be made higher than in the operation in the image forming mode.

Further, a relationship between the control temperature (first control temperature) in the operation in the above-described image forming mode and the control temperature (second control temperature) in the operation in the above-described borderless image forming mode is a relationship in the case where the same recording material (the same basis weight, the same sheet (paper) kind) is used between the operation in the image forming mode and the operation in the borderless image forming mode. Accordingly, the fixing heater 16 is controlled at the first control temperature in the case where the operation in the image forming mode is executed for a predetermined recording material, and the fixing heater 16 is controlled at the second control temperature higher than the first control temperature in the case where the operation in the borderless image forming mode is executed for the same recording material as the predetermined recording material.

Next, image forming processing in this embodiment will be described along a flowchart of FIG. 6.

When the control circuit portion 21 receives an image forming signal of an image forming job (S1), the control circuit portion 21 makes setting of the operation in the image forming mode (print made) on the basis of received information (S2). In this embodiment, the control circuit portion 21 determines, from an internal table, a target base temperature Tb and a print speed S which are used for subjecting the fixing belt 20 to the temperature control by the belt back thermistor 18 with recording material information (kind, basis weight, size), image information (monochromatic mode/color mode, with margin/without margin), and ambient (outside air) temperature information which are used in the image formation.

For example, in an example of plain paper (basis weight: 64 g/m$^2$), the color mode, and an environment of 25° C., Tb=190° C. and S=100% are determined.

Next, the control circuit portion 21 discriminates whether a mode of the image forming processing to be executed is the borderless printing (borderless image forming mode) or the (normal) printing ((normal) image forming mode) from the received information (S3).

First, a flow of the case of the (normal) printing will be described. In the case where the control circuit portion 21 discriminated in S3 that the image forming processing is the (normal) printing (No of S3), the control circuit portion 21 determines, as the fixing target temperature, the target base temperature Tb set in S2 described above (S4). Then, the control circuit portion 21 carries out the image formation while controlling the fixing heater 16 at this fixing target temperature (first control temperature) (S5). Further, the control circuit portion 21 discriminates whether or not the recording material subjected to the image formation is a final recording material in the image forming job (S6). In the case where the recording material is not the final recording material (No of S6), the image forming operation of S5 is repeated until the recording material becomes the final recording material, and in the case where the recording material becomes the final recording material (Yes of S6), the final recording material is discharged to an outside of the image forming apparatus 1, and therefore, the image forming job is ended.

Next, a flow of the case of the borderless printing will be described. In the case where the control circuit portion 21 discriminated in S3 that the image forming processing is the borderless printing (Yes of S3), the control circuit portion 21 calculates a correction amount (for example, 15° C.) for the target base temperature Tb set in S2 described above (S7). Then, the control circuit portion 21 determines, as the fixing target temperature (for example, 205° C.), a temperature obtained by adding the calculated correction amount to the target base temperature Tb (S8). Then, the control circuit portion 21 carries out the image formation while controlling the fixing heater 16 at this fixing target temperature (second control temperature) (S5). Further, the control circuit portion 21 discriminates whether or not the recording material subjected to the image formation is a final recording material in the image forming job (S6). In the case where the recording material is not the final recording material (No of S6), the image forming operation of S5 is repeated until the recording material becomes the final recording material, and in the case where the recording material becomes the final recording material (Yes of S6), the final recording material is discharged to an outside of the image forming apparatus 1, and therefore, the image forming job is ended.

As described above, in this embodiment, during the borderless printing, the toner image is fixed on the recording material by the fixing device 100 while controlling the fixing heater 16 at a fixing target temperature higher than a fixing target temperature during the (normal) printing. Accordingly, the toner can be fixed on the edge portion of the recording material with reliability by increasing the fixing temperature in the edge portion of the recording material. For this reason, the toner deposited on the edge portion of the recording material is not readily peeled off, so that deposition of the toner on a portion other than the recording material can be suppressed. Further, in this embodiment, the control temperature of the fixing heater 16 is only controlled, and therefore, for example, there is no need to add a constitution for cleaning the edge portion of the recording material. As a result of this, while suppressing complication and upsizing of the device, it is possible to suppress the deposition of the toner on the portion other than the recording material after the fixing in the operation in the borderless image forming mode.

Second Embodiment

A second embodiment will be described using FIGS. 7 and 8. In the above-described first embodiment, the fixing target temperature was controlled so that the recording material of the entire recording material becomes higher during the borderless printing than during the (normal) printing when the image formation is carried out. On the other hand, in this embodiment, during the borderless printing (for example, the image views (2) and (4) of FIG. 11) in the edge portion of the recording material parallel to the recording material conveying direction, control is carried out so that the temperature in the neighborhood of the edge portion of the recording material parallel to the recording material conveying direction is made not less than the edge (portion) fixable temperature. Other constitutions and actions are the same as those in the above-described first embodiment. For that reason, constituent elements similar to those in the first embodiment are omitted from description and illustration or are briefly described by adding thereto the same reference numerals or symbols. In the following, a difference from the first embodiment will be principally described.

In FIG. 7, temperature distributions during the borderless printing and during the (normal) printing are shown. Usually, when the fixing belt 20 is heated by the fixing heater 16, there is a tendency that the surface temperature of the fixing belt 20 becomes lower in the central portion than in the end portions with respect to the longitudinal direction because the fixing belt 20 dissipates heat in the opposite end portions with respect to the longitudinal direction. In the operation in the borderless image forming mode, the image is formable in the edge portion of the recording material with respect to the longitudinal direction of the fixing belt 20 crossing the recording material conveying direction. Further, during the borderless printing in which the image is formed on the recording material in the edge portion with respect to the longitudinal direction of the recording material (in the edge portion of the recording material parallel to the conveying direction), it is required that the toner in the edge portion is fixed on the recording material by increasing the temperature of the fixing belt 20 in the neighborhood of the edge portions on both sides with respect to the widthwise direction of the recording material.

As a method of increasing the temperature of the fixing belt 20 in the neighborhood of the edge portions on both sides with respect to the widthwise direction of the recording material, as shown in part (a) of FIG. 4, there is a method in which a lighting ratio of the heat generating element 16*b* to the heat generating element 16*a* is increased by using the fixing heater 16 provided with the heat generating element 16*a* larger in heat generation amount in the central portion than in each of the end portions with respect to the longitudinal direction and the heat generating element 16*b* larger in heat generation amount in each of the end portions than in the central portion with respect to the longitudinal direction. Further, as shown in part (b) of FIG. 4, even in a method in which by using the fixing heater 16 provided with a plurality of heat generating elements 16*c* and 16*d* different in heat generation region with respect to the longitudinal direction from each other, a lighting ratio of the heat generating element 16*c* corresponding to the edge portions on both sides of the recording material is increased, a similar effect can be obtained.

Further, as described above, by using the cooling fans 29 for cooling the non-sheet passing regions and the shutter 30 capable of changing the opening width thereof, for example, in the case where the size of the recording material is the small size, control is carried out by combining the heat generation amount of the fixing heater 16, an airflow rate of the cooling fans 29, and the opening width of the shutter 30, so that it becomes possible to increase the temperature of the fixing belt 20 in the neighborhood of the edge portions on both sides of the recording material.

In this embodiment, as described above, either one of the thermistors 18*a* to 18*f* which are the belt back thermistors 18 detects the temperature in the neighborhood of each of the end portions of the non-sheet passing regions Q depending on the size of the recording material passing through the fixing nip 27. That is, either one of the thermistors 18*a* to 18*f* as a temperature detecting portion detects the temperature of the fixing nip 27 in a position corresponding to the associated end portion, with respect to the longitudinal direction, of the recording material passing through the fixing nip 27.

In this embodiment, in the case where the operation in the borderless image forming apparatus (borderless printing) in which the image is formed on the edge portion with respect to the longitudinal direction is executed, the control circuit portion 21 changes the heat generation amount of the fixing heater 16 with respect to the longitudinal direction so that the temperature (at the end portion of the fixing heater 16) detected by the thermistor (the belt back thermistor 18) in the position corresponding to the end portion of the recording material with respect to the longitudinal direction becomes the second control temperature in a first period (during the sheet passing). Specifically, the control circuit portion 21 causes a lighting ratio of the heat generating element 16*b* (or 16*d*: second heat generating element) to the heat generating element 16*a* (or 16*c*: first heat generating element) in the first period to be higher in the case where the operation in the borderless image forming mode is executed than in the case where the operation in the (normal) image forming mode is executed for a predetermined recording material.

Further, in this embodiment, as described above, the cooling fans 29 for blowing the air against the end portions of the fixing belt 20 with respect to the longitudinal direction and the shutter 30 disposed between the cooling fans 29 and the fixing belt 20 and capable of changing the opening width of an opening 30*a* through which the air blown from the cooling fans 29 toward the fixing belt 20 is passable. In the case where the operation in the borderless image forming mode is executed, the control circuit portion 21 not only controls the airflow rate of the cooling fans 29 but also changes the opening width of the shutter 30 so that the temperature detected by the belt back thermistor 18 becomes the second control temperature in the first period.

For example, in the case where the "(normal) printing" is made and the image is formed on the recording material of a large size (A4), as shown in the upper-left column of FIG. 7, the control circuit portion 21 stops the cooling fans 29 and closes the opening 30*a* of the shutter 30. Further, the control circuit portion 21 controls the fixing heater 16 so that the temperature detected by each of the belt back thermistors 18 (thermistors 18*a* and 18*b*) becomes the first control temperature for the A4-size recording material in the first period. Incidentally, energization control of the fixing heater 16 including control using a detection temperature of the belt back thermistor 18 or the like is as described above in the first embodiment, and is basically the same as the energization control in the first embodiment except that the fixing target temperatures (first control temperature and second control temperature) based on detection results of the belt back thermistors 18 are only different between the (normal) printing and the borderless printing.

Next, in the case where the "borderless printing" is made and the image is formed on the recording material of a large size (A4), as shown in the lower-left column of FIG. 7, the control circuit portion 21 stops the cooling fans 29 and closes the opening 30*a* of the shutter 30. Further, the control circuit portion 21 changes the heat generation amount of the fixing heater 16 with respect to the longitudinal direction so that the temperature detected by each of the belt back thermistors 18 (thermistors 18*a* and 18*b*) becomes the second control temperature higher than the first control temperature (the case of the upper-left column of FIG. 7) for the A4-size recording material in the first period. Specifically, the lighting ratio of the heat generating element 16*a* (or 16*b*) to the heat generating element 16*b* (or 16*d*) in the first period is made higher in the case where the operation in the borderless image forming mode is executed than in the case where the operation in the (normal) image forming mode is executed.

Next, in the case where the (normal) printing is made and the image is formed on the recording material of a small size (A4R), as shown in the upper-right column of FIG. 7, the control circuit portion 21 drives the cooling fans 29 and changes the opening width of the opening 30*a* of the shutter 30 to an opening width corresponding to the small-size recording material. Further, the control circuit portion 21 changes the heat generation amount of the fixing heater 16 with respect to the longitudinal direction so that the temperature detected by each of the belt back thermistors 18 (thermistors 18*c* and 18*d*) becomes the first control temperature for the A4R-size recording material in the first period.

Further, in the case where the borderless printing is made and the image is formed on the recording material of a small size (A4R), as shown in the lower-right column of FIG. 7, the control circuit portion 21 drives the cooling fans 29 and changes. That is, the opening width of the opening 30*a* of the shutter 30 is made smaller than the opening in the case where the "(normal) printing" is made and the image is formed on the small-size (A4R) recording material (the upper-right column of FIG. 7). Specifically, the position and the opening width of the opening 30*a* of the shutter 30 are changed so that the air from the cooling fans 29 does not blow against the end portions of the small-size recording material with respect to the widthwise direction and so that the air from the cooling fans 29 blows against the end portions of the fixing belt 20 in order to suppress temperature rise at the end portions of the fixing belt 20 with respect to the widthwise direction. At this time, the airflow rate of the cooling fans 29 is made smaller than the airflow rate of the cooling fans 29 during the (normal) printing. Further, the control circuit portion 21 changes the heat generation amount of the fixing heater 16 with respect to the longitudinal direction so that the temperature detected by each of the belt back thermistors 18 (thermistors 18*c* and 18*d*) becomes the second control temperature higher than the first control temperature (the case of the upper-right column of FIG. 7) for the A4R-size recording material in the first period.

Incidentally, in the case where the "borderless printing" is made and the image is formed on the small-size (A4R) recording material and in the case where the "normal) printing" is made and the image is formed on the small-size (A4R) recording material, either one of the heat generation amount of the fixing heater 16 with respect to the longitudinal direction, the airflow rate of the cooling fans 29, and the opening width of the shutter 30 may be changed, or two of these may be changed. For example, only the heat generation amount of the fixing heater 16 with respect to the longitudinal direction may be changed in the case where the "normal) printing" is made and the image is formed on the small-size (A4R) recording material, or in addition to the change in heat generation amount of the fixing heater 16 with respect to the longitudinal direction, either one of the airflow rate of the cooling fans 29 and the opening width of the shutter 30. Further, without changing the heat generation amount of the fixing heater 16 with respect to the longitudinal direction, either one of the airflow rate of the cooling fans 29 and the opening width of the shutter 30 may be changed in the case where the "(normal) printing" is made and the image is formed on the small-size (A4R) recording material.

Here, in the case where the heat generation amount of the fixing heater 16 is not changed, both the airflow rate of the cooling fans 29 and the opening width of the shutter 30 may preferably be changed in the case where the "(normal) printing" is made and the image is formed on the small-size (A4R) recording material. That is, in the case where the heat generation amount of the fixing heater 16 is not changed, end portion temperature rise of the fixing belt 20 becomes large, and correspondingly thereto, the airflow rate of the cooling fans 29 is made large. However, when the airflow rate of the cooling fans 29 is made large, the end portions of the recording material are excessively cooled, and therefore, by narrowing the opening width of the shutter 30, the air of the cooling fans 29 is prevented from blowing against the edge portions of the recording material.

When the control circuit portion 21 receives an image forming signal of an image forming job (S101), the control circuit portion 21 makes setting of the operation in the image forming mode (print made) on the basis of received information (S102). In this embodiment, the control circuit portion 21 determines, from an internal table, a target base temperature Tb and a print speed S which are used for subjecting the fixing belt 20 to the temperature control by the belt back thermistor 18 with recording material information (kind, basis weight, size), image information (monochromatic mode/color mode, with margin/without margin), and ambient (outside air) temperature information which are used in the image formation. For example, in an example of plain paper (basis weight: 64 g/m$^2$), the color mode, and an environment of 25° C., Tb=190° C. and S=100% are determined. Next, the control circuit portion 21 discriminates whether a mode of the image forming processing to be executed is the borderless printing (borderless image forming mode) or the (normal) printing (normal) image forming mode) from the received information (S103).

First, a flow of the case of the (normal) printing will be described. In the case where the control circuit portion 21 discriminated in S103 that the image forming processing is the (normal) printing (No of S103), the control circuit portion 21 determines, as the fixing target temperature, the target base temperature Tb set in S102 described above (S104). Then, the control circuit portion 21 carries out the image formation while controlling the fixing heater 16 at this fixing target temperature (first control temperature) (S105). Further, the control circuit portion 21 discriminates whether or not the recording material subjected to the image formation is a final recording material in the image forming job (S106). In the case where the recording material is not the final recording material (No of S106), the image forming operation of S105 is repeated until the recording material becomes the final recording material, and in the case where the recording material becomes the final recording material (Yes of S106), the final recording material is discharged to an outside of the image forming apparatus 1, and therefore, the image forming job is ended.

Next, a flow of the case of the borderless printing will be described. In the case where the control circuit portion 21 discriminated in S103 that the image forming processing is the borderless printing (Yes of S103), the control circuit portion 21 checks the size of the recording material set in S102 described above (S107). For example, in the case where the image is formed on the recording material of A4 when the maximum size is A4 (Yes of S107), the temperature in the edge portions of the A4-size recording material is increased by changing the heat generation amount (heater Duty) so that the lighting ratio of the heat generating element 16*b* (or 16*d*) larger in heat generation amount in each of the end portions than in the central portion is increased compared with the heat generating element 16*a* (16*c*) larger in heat generation amount in the central portion than in each of the end portions (S108).

Then, the control circuit portion 21 causes the belt back thermistors 18 (thermistors 18*a* and 18*b* in the case of the A4 size) to detect the temperature in the end portions of the A4-size recording material, and discriminates whether or not a detection temperature is not less than the edge (portion) fixable temperature (S109). In S109, in the case where the detection temperature by the belt back thermistors 18 does not reach the edge fixable temperature (No of S109), the sequence returns to S108, and the heat generation amount of the fixing heater 16 is changed, so that the temperature in the edge portions of the recording material is increased. For example, a correction amount for the target base temperature Tb set in the above-described S102 is calculated, and a temperature obtained by adding the calculated correction amount to the target base temperature Tb is determined as a fixing target temperature. Then, the control circuit portion 21 changes the heat generation amount of the fixing heater 16 with respect to the longitudinal direction so that the temperature detected by the belt back thermistors 18 becomes the fixing target temperature (second control temperature, edge fixable temperature).

In S109, in the case where the detection temperature by the belt back thermistors 18 reaches the edge fixable temperature (Yes of S109), the image forming operation is performed (S105). Further, the control circuit portion 21 discriminates whether or not the recording material on which the image is formed is a fixing recording material in the image forming job (S106). In the case where the recording material is not the final recording material (No of S106), the operation is repeated from S103 until the recording material becomes the final recording material, and in the case where the recording material is the final recording material (Yes of S106), the final recording material is discharged to the outside of the image forming apparatus 1, and then, the image forming job is ended.

On the other hand, in S107, in the case where the size of the recording material is the small size (for example, A4) which is not the maximum size (No of S107), depending on the size, the heat generation amount of the fixing heater 16, the airflow rate of the cooling fans 29, and the opening width of the shutter 30 are changed (S110). For example, the heat generation amount (heater Duty) of the fixing heater 16, the airflow rate of the cooling fans 29, and the opening width of the shutter 30 are changed by decreasing the lighting ratio of the heat generating element 16*b* (or 16*d*) larger in heat generation amount in the end portions than the central portion with respect to the longitudinal direction compared with the heat generating element 16*a* (or 16*c*) larger in heat generation amount in the central portion than in the end portions with respect to the longitudinal direction, by lowering the airflow rate of the cooling fans 29, and by closing the opening width of the shutter 30 in a predetermined amount. By this, the temperature of the small-size recording material in the end portions is increased.

Then, the control circuit portion 21 causes the belt back thermistors 18 (thermistors 18*c* and 18*d* in the case of the A4R size) to detect the temperature in the end portions of the small-size recording material, and discriminates whether or not a detection temperature is not less than the edge (portion) fixable temperature (S111). In S111, in the case where the detection temperature by the belt back thermistors 18 does not reach the edge fixable temperature (No of S111), the sequence returns to S110, and the heat generation amount of the fixing heater 16, the airflow rate of the cooling fans 29, and the opening width of the shutter 30 are changed, so that the temperature in the edge portions of the small-size recording material is increased.

In S111, in the case where the detection temperature by the belt back thermistors 18 reaches the edge fixable temperature (Yes of S111), the image forming operation is performed (S105). Further, the control circuit portion 21 discriminates whether or not the recording material on which the image is formed is a fixing recording material in the image forming job (S106). In the case where the recording material is not the final recording material (No of S106), the operation is repeated from S103 until the recording material becomes the final recording material, and in the case where the recording material is the final recording material (Yes of S106), the final recording material is discharged to the outside of the image forming apparatus 1, and then, the image forming job is ended.

In the flowchart of FIG. 8, as a method of temperature control in the edge portions of the recording material, the method in which all of the heat generation amount of the fixing heater 16, the airflow rate of the cooling fans 29, and the opening width of the shutter 30 are changed was described. However, as described above, the method of the temperature control in the edge portions of the recording material may be executed by a method using either one or more parameters. Further, in the above-described example, the borderless printing in the edge portions on both sides of the recording material, which are parallel to the recording material conveying direction (i.e., in the edge portions on both sides with respect to the widthwise direction) was described, but during the borderless printing in the edge portion on one side of the recording material which is parallel to the recording material conveying direction, the temperature control may also be carried out so that the heat generation amount of the fixing heater 16, the airflow rate of the cooling fans 29, and the opening width of the shutter 30, which are on a side corresponding to the edge portion where the borderless printing is made.

As described above, in this embodiment, during the borderless printing in the edge portion(s) of the recording material parallel to the recording material conveying direction, the temperature in the neighborhood of the edge portion(s) of the recording material parallel to the recording material conveying direction is controlled to the edge fixable temperature or more. Accordingly, the fixing temperature in the edge portion(s) of the recording material is increased, so that the toner can be fixed to the edge portion(s) of the recording material with reliability. For this reason, the toner deposited on the edge portion(s) of the recording material is not readily peeled off, so that deposition of the toner in a portion other than the recording material can be suppressed. Further, in this embodiment, constitutions (parameters), which have already been possessed by the image forming apparatus 1, such as the heat generation amount of the fixing heater 16, the airflow rate of the cooling fans 29, and the shutter 30 are only controlled, and therefore, there is no need to add, for example, a constitution for cleaning the edge portion(s) of the recording material. As a result, it is possible to suppress the deposition of the toner on the portion other than the recording material after the fixing in the operation in the borderless image forming mode while suppressing complication and upsizing of the image forming apparatus.

Third Embodiment

A third embodiment will be described using FIGS. 9 and 10. In the above-described first embodiment, the fixing target temperature was controlled so that the recording material of the entire recording material becomes higher during the borderless printing than during the (normal) printing when the image formation is carried out. On the other hand, in this embodiment, during the borderless printing (for example, the image view (3) of FIG. 11) in the edge portion which is either one of a leading end and a trailing end of the recording material, control is carried out so that the temperature in the neighborhood of the edge portion which is either one of the leading end and the trailing end of the recording material is made not less than the edge (portion) fixable temperature. Other constitutions and actions are the same as those in the above-described first embodiment. For that reason, constituent elements similar to those in the first embodiment are omitted from description and illustration or are briefly described by adding thereto the same reference numerals or symbols. In the following, a difference from the first embodiment will be principally described.

In FIG. 9, a temperature progression of the fixing belt 20 during continuous sheet passing in which a plurality of recording materials are passed through the fixing nip 27. In FIG. 9, a solid line indicates a temperature of the fixing belt 20 in the central portion with respect to the longitudinal direction in the case where the control in this embodiment was carried out ("UNDER CONTROL: BELT CENTER"), and a broken line indicates a temperature of the fixing belt 20 in the central portion with respect to the longitudinal direction in the case where the control in this embodiment was not carried out (rising period, control in which the control temperature in the sheet interval is not increased) ("NO CONTROL: BELT CENTER"). Usually, when the continuous sheet passing is made, there is a tendency that as indicated by the broken line, the surface temperature of the fixing belt 20 is gradually lowers at the trailing end (upstream end with respect to the conveying direction) of a first recording material compared with the leading end (downstream end with respect to the conveying direction) of the first recording material. During the borderless printing, it is required that the toner in the edge portions is fixed on the recording material by increasing the temperature of the fixing belt 20 in the neighborhood of the edge portions at the leading end and the trailing end of the recording material.

As a method of increasing the temperature of the fixing belt 20 in the neighborhood of the edge portions at the leading end and the trailing end of the recording material, for example, the control temperature during the sheet interval (second period) is set higher than the control temperature during the sheet passing of the recording material (first period).

Further, as regards the leading end portion of the recording material, when the recording material is passed through the fixing nip 27, the control temperature is switched to the control temperature during the sheet passing so that the temperature in the edge portion as the leading end portion of the recording material ensures the edge fixable temperature or more. On the other hand, as regards the trailing end portion of the recording material, there is a method in which when the recording material comes off from the fixing nip 27, the control temperature is switched to the control temperature during the sheet passing so that the temperature in the edge portion as the trailing end portion of the recording material ensures the edge fixable temperature or more.

This will be specifically described. First, in this embodiment, in the case where the operation in the borderless image forming mode is executed, the control circuit portion 21 controls the fixing heater 16 at a second control temperature in a second period (sheet interval). The second control temperature at this time is higher than a first control temperature in a period (first period) in which the recording material passes through the fixing nip 27 during execution of the operation in the (normal) image forming mode for the same recording material. Particularly, in this embodiment, the second control temperature is higher than a third control temperature in a period (first period) in which the recording material passes through the fixing nip 27 during execution of the operation in the borderless image forming mode. That is, as shown in FIG. 9, in the case where the operation in the borderless image forming mode is executed for a predetermined recording material, the control circuit portion 21 not only controls the fixing heater 16 so that the temperature detected by the belt back thermistor 18 becomes the third control temperature (control temperature during sheet passing, print control temperature) in the first period, but also controls the fixing heater 16 so that in the second period, the temperature detected by the belt back thermistor 18 becomes the second control temperature (sheet interval control temperature) higher than the temperature in the first period.

Further, in this embodiment, in the case where the operation in the borderless image forming mode is executed, the control circuit portion 21 controls the fixing heater 16 so that the temperature detected by the belt back thermistor 18 becomes the second control temperature (rising control temperature) in a rising period from a start of heating of the fixing heater 16 until the downstream end (leading end) of the first recording material reaches the fixing nip 27. This control temperature is also a temperature higher than the first control temperature and the third control temperature. By this, also, as regards the edge portion as the leading end portion of the first recording material in the image forming job, the control temperature can be made the edge fixable temperature or more.

Incidentally, in this embodiment, in the case of the (normal) printing, the control temperature during the rising is controlled somewhat lower than the control temperature during the sheet passing (print control temperature). Further, the sheet interval control temperature is made the same as the print control temperature in the case where the sheet interval is shorter than a predetermined time and is made lower than the print control temperature in the case where the sheet interval is longer than the predetermined time.

Further, in the borderless printing, a switching timing from the rising control temperature to the control temperature during the sheet passing and a switching timing from the sheet interval control temperature to the control temperature during the sheet passing change depending on a temperature difference between the rising control temperature and the control temperature during the sheet passing and a temperature difference between the sheet interval temperature and the control temperature during the sheet passing, respectively. In the case where the temperature difference between the rising temperature (or the sheet interval control temperature) and the control temperature during the sheet passing is large, the switching may be made before the leading end of the recording material enters the fixing nip 27. This is because the temperature in the neighborhood of the edge portion being the leading end portion can be made the edge fixable temperature or more during the passing of the recording material through the fixing nip 27. On the other hand, in the case where the rising control temperature (or the sheet interval control temperature) and the control temperature during the sheet passing is small, the control temperature lowers to the control temperature during the sheet passing immediately after the control temperature is switched, so that there is a liability that the temperature in the neighborhood of the edge portion being the leading end portion of the recording material cannot be made the edge fixable temperature or more. For this reason, in the case where the temperature difference is small, the switching may preferably be made after the leading end of the recording material enters the fixing nip 27. In summary, the switching may only be required to be made from the rising control temperature (or the sheet interval control temperature) to the control temperature during the sheet passing at a timing when the temperature in the neighborhood of the edge portion being the leading end portion of the recording material becomes the edge fixable temperature during the passing of the leading end of the recording material through the fixing nip 27.

Further, in the borderless printing, the switching timing from the control temperature during the sheet passing to the sheet interval control temperature is before the trailing end of the recording material comes off from the fixing nip 27. This timing also changes depending on the temperature difference between the control temperature during the sheet passing and the sheet interval control temperature. That is, the switching may only be required to be made from the control temperature during the sheet passing to the sheet interval control temperature at a timing when the temperature in the neighborhood of the edge portion being the trailing end portion of the recording material during the passing of the trailing end of the recording material through the fixing nip 27. When the temperature difference is large, electric power supply to the fixing heater 16 becomes large during the switching of the control temperature, and therefore, temperature rise becomes abrupt. On the other hand, when the temperature difference is small, a change in electric power supply to the fixing heater 16 is small during the switching of the control temperature, so that the temperature rise becomes moderate. For this reason, the switching is made from the control temperature during the sheet passing to the sheet interval control temperature at a timing depending on a temperature rising speed.

In FIG. 9, the switching timing from the rising control temperature to the control temperature during the sheet passing is a timing when the leading end of the first recording material enters the fixing nip 27. Further, the switching timing from the control temperature during the sheet passing to the sheet interval control temperature is before the trailing end of the recording material comes off from the fixing nip 27. Further, the switching timing from the sheet interval control temperature to the control temperature during the sheet passing is after the leading end of the recording material enters the fixing nip 27. These timings are determined by the temperature differences between the associated control temperatures as described above, and thus are not limited to the example shown in FIG. 9.

Next, the image forming processing in this embodiment will be described along a flowchart of FIG. 10. When the control circuit portion 21 receives an image forming signal of an image forming job (S201), the control circuit portion 21 makes setting of the operation in the image forming mode (print made) on the basis of received information (S202). In this embodiment, the control circuit portion 21 determines, from an internal table, a target base temperature Tb and a print speed S which are used for subjecting the fixing belt 20 to the temperature control by the belt back thermistor 18 with recording material information (kind, basis weight, size), image information (monochromatic mode/color mode, with margin/without margin), and ambient (outside air) temperature information which are used in the image formation. For example, in an example of plain paper (basis weight: 64 g/m$^2$), the color mode, and an environment of 25° C., Tb=190° C. and S=100% are determined. Next, the control circuit portion 21 discriminates whether a mode of the image forming processing to be executed is the borderless printing (borderless image forming mode) or the (normal) printing ((normal) image forming mode) from the received information (S203).

First, a flow of the case of the (normal) printing will be described. In the case where the control circuit portion 21 discriminated in S203 that the image forming processing is the (normal) printing (No of S203), the control circuit portion 21 determines, as the fixing target temperature, the target base temperature Tb set in S202 described above (S204). Then, the control circuit portion 21 carries out the image formation while controlling the fixing heater 16 at this fixing target temperature (first control temperature) (S205). Further, the control circuit portion 21 discriminates whether or not the recording material subjected to the image formation is a final recording material in the image forming job (S206). In the case where the recording material is not the final recording material (No of S206), the image forming operation of S205 is repeated until the recording material becomes the final recording material, and in the case where the recording material becomes the final recording material (Yes of S206), the final recording material is discharged to an outside of the image forming apparatus 1, and therefore, the image forming job is ended.

Next, a flow in the case of the borderless printing will be described. In the case where the control circuit portion 21 discriminated in S203 that the image forming processing is the borderless printing (Yes of S203), the control circuit portion 21 sets each of the rising control temperature and the sheet interval control temperature higher than the control temperature during the sheet passing (print control temperature) by 15° C. (S207). Further, the control circuit portion 21 starts the image forming operation (S208), and increases the temperature of the fixing belt 20 by controlling the fixing heater 16 at a corrected rising control temperature (S209). Then, during passing of the leading end of the recording material through the fixing nip 27, the control circuit portion 21 switches the control temperature from the rising control temperature to the print control temperature at a timing when the temperature in the neighborhood of the edge portion being the leading end portion of the recording material is capable of ensuring a necessary temperature, i.e., at a timing when the temperature in the neighborhood of the edge portion becomes the edge fixable temperature or more (S210). Then, the control circuit portion 21 controls the fixing heater 16 at the print control temperature, so that the recording material is passed through the fixing nip 27 (S211).

Then, before the trailing end of the recording material comes off from the fixing nip 27, the control temperature is switched from the print control temperature to a corrected sheet interval control temperature (S212). Then, the control circuit portion 21 controls the fixing heater 16 at the corrected control temperature (S213).

Further, the control circuit portion 21 discriminates whether or not the recording material on which the image is formed is a fixing recording material in the image forming job (S214). In the case where the recording material is not the final recording material (No of S214), the operation is repeated from S208 until the recording material becomes the final recording material, and in the case where the recording material is the final recording material (Yes of S214), the final recording material is discharged to the outside of the image forming apparatus 1, and then, the image forming job is ended.

Incidentally, in the above-described embodiment, the borderless printing for the edge portions at the leading end and the trailing end of the recording material was described.

However, during the borderless printing for either one of the edge portions being the leading end portion and the trailing end portion of the recording material, only the edge portion where the borderless printing is made may be subjected to temperature adjustment (temperature control). For example, in the case where the leading end portion of the recording material is subjected to the borderless printing and the trailing end portion of the recording material is subjected to the (normal) printing, each of the rising control temperature and the sheet interval control temperature is made higher than the control temperature during the sheet passing, and the switching timing from the rising control temperature to the control temperature during the sheet passing and the switching timing from the sheet interval temperature to the control temperature during the sheet passing are made the above-described timings. On the other hand, the switching timing from the control temperature during the sheet passing to the sheet interval control temperature is made similar to the switching timing during the (normal) printing. Further, in the case where the trailing end of the recording material is subjected to the borderless printing and the leading end of the recording material is subjected to the (normal) printing, the sheet interval control temperature is made higher than the control temperature during the sheet passing, and the switching timing from the control temperature during the sheet passing to the sheet interval control temperature is made the above-described timing. On the other hand, the switching timing from each of the rising control temperature and the sheet interval temperature to the control temperature during the sheet passing is made similar to the switching timing during the (normal) printing.

As described above, in this embodiment, during the borderless printing in the recording material edge portion(s) being either one of the leading end portion and the trailing end portion of the recording material, the temperature in the neighborhood of the recording material edge portion(s) being either one of the leading end portion and the trailing end portion of the recording material is controlled to the edge fixable temperature or more. Accordingly, the fixing temperature in the edge portion(s) of the recording material is increased, so that the toner can be fixed to the edge portion(s) of the recording material with reliability. For this reason, the toner deposited on the edge portion(s) of the recording material is not readily peeled off, so that deposition of the toner in a portion other than the recording material can be suppressed. Further, similarly as in the first and second embodiments, it is possible to suppress the deposition of the toner on the portion other than the recording material after the fixing in the operation in the borderless image forming mode while suppressing the complication and the upsizing of the image forming apparatus.

The second embodiment and the third embodiment which are described above may be combined with each other. That is, in the case where either one of the edge portions being the leading end portion and the trailing end portion of the recording material and either one of the edge portions on both sides of the recording material parallel to the recording material conveying direction are subjected to the borderless printing, or in the case where an entire surface of the recording material is subjected to the borderless printing, the above-described first embodiment may be executed, but the second embodiment and the third embodiment may be executed in combination with each other. In this case, when the operation in the borderless image forming mode is performed, the control circuit portion 21 changes the heat generation amount of the fixing heater 16 with respect to the longitudinal direction so that the temperature detected by the belt back thermistor 18 becomes the second control temperature in the first period (during the sheet passing) and the second period (sheet interval) during the rising, and not only controls the airflow rate of the cooling fans 29 but also changes the opening width of the shutter 30 so that the temperature detected by the belt back thermistor 18 becomes the second control temperature.

For example, while the belt temperature in either one of the edge portions being the leading end portion and the trailing end portion of the recording material is changed so that the control temperature is made higher than the print control temperature during the rising and during the sheet interval, in either one of the edge portions being the leading end portion and the trailing end portion of the recording material, the temperature of the fixing belt 20 in the neighborhood of the associated edge portion of the recording material is increased by increasing the lighting ratio of the heat generating element 16*b* (or 16*d*) larger in heat generation amount in the end portions than in the central portion with respect to the longitudinal direction compared with the heat generating element 16*a* (or 16*c*) larger in heat generation amount in the central portion than in the end portions with respect to the longitudinal direction. At this time, the belt temperature in the edge portions of the recording material cannot be completely controlled only by a ratio of the heat generation amount of the fixing heater 16, so that the opening width of the shutter 30 is controlled depending on the width of the recording material passed while driving the cooling fans 29. Incidentally, as regards the control of the fixing heater 16 for either one of the edge portions being opposite end portions of the recording material with respect to the widthwise direction, certain control is carried out until the image forming job is ended irrespective of whether or not there is a recording material in the fixing nip 27. That is, in either of during the sheet passing and during the sheet interval, control in which the lighting ratio of the heat generating element 16*b* (or 16*d*) is increased compared with the lighting ratio of the heat generating element 16*a* (or 16*c*) is carried out.

According to the present invention, while suppressing the complication and the upsizing of the image forming apparatus, the deposition on the portion other than the recording material after the fixing in the operation in the borderless image forming mode can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-009351 filed on Jan. 25, 2024, which is hereby incorporated by reference herein in its entirety.

What is claimed is:

1. An image forming apparatus comprising:

an executing portion configured to operate in a borderless image forming mode in which a toner image is formed in at least one edge portion of a recording material of a predetermined size and to operate in an image forming mode in which the toner image is not formed in the edge portion of respective edges of the recording material of the predetermined size;

an image forming portion configured to form the toner image on the recording material;

a fixing device including a fixing member, a heating portion for heating the fixing member, a nip-forming portion for forming a fixing nip in which the recording material is nipped and conveyed between itself and the fixing member and for fixing the toner image on the recording material when the recording material on which the toner image is carried passes through the fixing nip, and a temperature detecting portion for detecting a temperature of the fixing member or the heating portion; and a controller configured to control the heating portion on the basis of a detection result of the temperature detecting portion, wherein in a case where the operation in the image forming mode is executed for the recording material of the predetermined size, the controller controls the heating portion so that the temperature becomes a first control temperature in a first period which is a period in which the recording material passes through the fixing nip, and wherein in a case where the operation in the borderless image forming mode is executed for the recording material of the predetermined size, the controller controls the heating portion so that the temperature becomes a second control temperature higher than the first control temperature in the first period.

2. The image forming apparatus according to claim 1, wherein in the operation in the borderless image forming mode, the image forming apparatus is capable of forming an image in the edge portion of the recording material with respect to a longitudinal direction of the fixing member crossing a conveying direction of the recording material.

3. The image forming apparatus according to claim 2, wherein with respect to the longitudinal direction, the heating portion is capable of changing temperature control in an end portion and a central portion of a region in which the recording material passes through the fixing nip, wherein the temperature detecting portion detects the temperature of the fixing member or the heating portion in a position corresponding to an end portion, with respect to the longitudinal direction, of the recording material passing through the fixing nip, and the controller controls the end portion of the heating portion in the first period so that the temperature becomes the first control temperature period in a case where the operation in the image forming mode is executed for the recording material of the predetermined size, and so that the temperature becomes the second control temperature in a case where the operation in the borderless image forming mode in which the image is formed in the edge portion of the recording material with respect to the longitudinal direction is executed for the recording material of the predetermined size.

4. The image forming apparatus according to claim 3, wherein the heating portion includes a first heat generating element larger in heat generation amount in the central portion of the region than in the end portion of the region with respect to the longitudinal direction, and includes a second heat generating element larger in heat generation amount in the end portion than in the central portion of the region with respect to the longitudinal direction, and wherein the controller makes a lighting ratio of the second heat generating element to the first heat generating element in the first period in the case where the operation in the borderless image forming mode is executed, higher than in the case where the operation in the image forming mode is executed.

5. The image forming apparatus according to claim 3, further comprising a fan configured to blow air to an end portion of the fixing member with respect to the longitudinal direction, wherein in the case where the operation in the borderless image forming mode is executed, the controller controls an airflow rate of the fan so that the temperature detected by the temperature detecting portion becomes the second control temperature in the first period.

6. The image forming apparatus according to claim 5, further comprising a shutter provided between the fan and the fixing member and capable of changing an opening width of an opening through which the air is blown from the fan toward the fixing member is passable, wherein in the case where the operation in the borderless image forming mode is executed, the controller controls the airflow rate of the fan and changes the opening width of the shutter so that the temperature detected by the temperature detecting portion becomes the second control temperature in the first period.

7. The image forming apparatus according to claim 3, further comprising:

a fan configured to blow air to an end portion of the fixing member with respect to the longitudinal direction, and a shutter provided between the fan and the fixing member and capable of changing an opening width of an opening through which the air is blown from the fan toward the fixing member is passable, wherein the temperature detecting portion detects the temperature of the fixing member or the heating portion in the position corresponding to the end portion, with respect to the longitudinal direction, of the recording material passing through the fixing nip, and wherein in the case where the operation in the borderless image forming mode is executed, the controller controls an airflow rate of the fan and changes the opening width of the shutter so that the temperature detected by the temperature detecting portion becomes the second control temperature in the first period.

8. The image forming apparatus according to claim 1, wherein a period from passing of an upstream end, with respect to a conveying direction, of a first recording material through the fixing nip until a downstream end, with respect to a conveying direction, of a second recording material subsequent to the first recording material reaches the fixing nip is a second period, and wherein the controller controls the temperature of the heating portion so that the temperature of the heating portion in the second period in a case where the operation in the image forming mode is executed for the recording material of the predetermined size and the temperature of the heating portion in the second period in a case where the operation in the borderless image forming mode is executed for the recording material of the predetermined size are the same.

9. An image forming apparatus comprising:

an executing portion configured to operate in a borderless image forming mode in which a toner image is formed in at least one edge portion of a recording material of a predetermined size and to operate in an image forming mode in which the toner image is not formed in the edge portion of respective edges of the recording material of the predetermined size;

an image forming portion configured to form the toner image on the recording material;

a fixing device including a fixing member, a heating portion for heating the fixing member, a nip-forming portion for forming a fixing nip in which the recording material is nipped and conveyed between itself and the fixing member and for fixing the toner image on the recording material when the recording material on which the toner image is carried passes through the fixing nip, and a temperature detecting portion for detecting a temperature of the fixing member or the heating portion; and a controller configured to control the heating portion on the basis of a detection result of the temperature detecting portion, wherein in a case where the operation in the image forming mode is executed for the recording material of the predetermined size, the controller controls the heating portion so that the temperature becomes a first control temperature in a second period from passing of an upstream end, with respect to a conveying direction, of a first recording material through the fixing nip until a downstream end, with respect to the conveying direction, of a second recording material subsequent to the first recording material reaches the fixing nip, and wherein in a case where the operation in the borderless image forming mode in which an image is formed in the edge portion of the recording material of the predetermined size with respect to the conveying direction is executed, the controller controls the heating portion so that the temperature becomes a second control temperature higher than the first control temperature in the second period.

10. The image forming apparatus according to claim 9, wherein in the case where the operation in the borderless image forming mode is executed, the controller controls the heating portion so that the temperature detected by the temperature detecting portion becomes the second control temperature in a rising period from a start of heating of the heating portion until a downstream end of an initial recording material with respect to the conveying direction reaches the fixing nip.

11. The image forming apparatus according to claim 9, wherein a period in which the recording material passes through the fixing nip is a first period, and wherein in a case where an operation in an image forming mode in which an image is formed in an edge portion of the recording material of the predetermined size with respect to the conveying direction is executed, the controller controls the heating portion so that a temperature of the heating portion in the second period is higher than a temperature of the heating portion in the first period.

12. The image forming apparatus according to claim 1, further comprising:

a fan configured to blow air to an end portion of the fixing member with respect to a longitudinal direction, and a shutter provided between the fan and the fixing member and capable of changing an opening width of an opening through which the air is blown from the fan toward the fixing member is passable, wherein with respect to a longitudinal direction of the fixing member crossing a conveying direction of the recording material, the heating portion is capable of changing temperature control in an end portion and a central portion of a region in which the recording material passes through the fixing nip, wherein the temperature detecting portion detects the temperature of the fixing member or the heating portion in a position corresponding to the end portion, with respect to the longitudinal direction, of the recording material passing through the fixing member, wherein a period from passing of an upstream end, with respect to a conveying direction, of a first recording material through the fixing nip until a downstream end, with respect to a conveying direction, of a second recording material subsequent to the first recording material reaches the fixing nip is a second period, and wherein in a case where the operation in the borderless image forming mode is executed, the controller changes the temperature control of the heating portion with respect to the longitudinal direction so that the temperature detected by the temperature detecting portion becomes the second control temperature in the first period and the second period, and the controller controls an airflow rate of the fan and changes the opening width of the shutter so that the temperature detected by the temperature detecting portion becomes the second control temperature in the first period.

13. The image forming apparatus according to claim 1, wherein the fixing member is an endless fixing belt.

14. The image forming apparatus according to claim 1, wherein the heating portion is a ceramic heater.

15. The image forming apparatus according to claim 13, wherein the heating portion heats the fixing belt in contact with an inner peripheral surface of the fixing belt.

16. The image forming apparatus according to claim 13, wherein the heating portion forms the fixing nip in cooperation with the nip-forming portion through the fixing belt.

17. The image forming apparatus according to claim 1, wherein the temperature detecting portion is provided in a plurality of positions corresponding to end portions of recording materials different in size with respect to a longitudinal direction of the fixing member crossing a conveying direction of the recording materials passing through the fixing nip, and detects the temperature of the fixing member in each of the positions.

18. The image forming apparatus according to claim 1, wherein the borderless image forming mode is a mode in which a toner image larger than the recording material of the predetermined size is formed, and then is transferred onto the recording material of the predetermined size.

* * * * *